US 8,938,067 B2

United States Patent
Martin et al.

(10) Patent No.: US 8,938,067 B2
(45) Date of Patent: Jan. 20, 2015

(54) FORMAT PRESERVING ENCRYPTION METHODS FOR DATA STRINGS WITH CONSTRAINTS

(75) Inventors: Luther W. Martin, San Jose, CA (US); Terence Spies, Mountain View, CA (US); Matthew J. Pauker, San Francisco, CA (US)

(73) Assignee: Voltage Security, Inc., Cupertino, CA (US)

( * ) Notice: Subject to any disclaimer, the term of this patent is extended or adjusted under 35 U.S.C. 154(b) by 1059 days.

(21) Appl. No.: 12/610,221

(22) Filed: Oct. 30, 2009

(65) Prior Publication Data

US 2011/0103579 A1    May 5, 2011

(51) Int. Cl.
*H04L 9/28* (2006.01)
*H04L 9/06* (2006.01)
(Continued)

(52) U.S. Cl.
CPC ............ *H04L 9/0643* (2013.01); *G06F 21/602* (2013.01); *H04L 9/0618* (2013.01); *G06F 2221/2107* (2013.01); *H03M 13/096* (2013.01);
(Continued)

(58) Field of Classification Search
CPC ... G06F 21/60; G06F 21/602; G06F 21/6209; G06F 21/64; G06F 2221/2107; H04L 9/00; H04L 9/06; H04L 9/0618; H04L 6/0643; H04L 9/3236; H04L 2209/26; H04L 63/04; H04L 63/0428; H04L 63/12; H04L 63/123; H03M 13/96
USPC ...................... 380/28, 42; 713/150–151, 187; 707/687, 697, 698
See application file for complete search history.

(56) References Cited

U.S. PATENT DOCUMENTS

| 6,836,765 | B1 | 12/2004 | Sussman |
| 6,885,748 | B1 * | 4/2005 | Wang ............................ 380/201 |
| 7,418,098 | B1 | 8/2008 | Mattsson |

(Continued)

FOREIGN PATENT DOCUMENTS

| EP | 1 209 550 | 5/2002 |
| WO | 2006/107777 | 10/2006 |

OTHER PUBLICATIONS

Bellare et al, "Format-Preserving Encryption" [Online], May 30, 2009 [Retrieved on: Oct. 30, 2012], Selected Areas in Cryptography 2009, [Retrieved from: http://eprint.iacr.org/cgi-bin/getfile.pl?entry=2009/251&version=20090601:153053&file=251.pdf].*

(Continued)

*Primary Examiner* — Tae Kim
*Assistant Examiner* — Eric W Shepperd
(74) *Attorney, Agent, or Firm* — Treyz Law Group; G. Victor Treyz; Michael H. Lyons

(57) ABSTRACT

Format preserving encryption (FPE) cryptographic engines are provided for performing encryption and decryption on strings. A plaintext string may be converted to ciphertext by repeated application of a format preserving encryption cryptographic algorithm. Following each application of the format preserving cryptographic algorithm, the resulting version of the string may be analyzed to determine whether desired string constraints have been satisfied. If the string constraints have not been satisfied, further applications of the format preserving cryptographic algorithm may be performed. If the string constraints have been satisfied, the current version of the string may be used as an output for the cryptographic engine.

4 Claims, 14 Drawing Sheets

(51) Int. Cl.
*G06F 21/60* (2013.01)
*H03M 13/09* (2006.01)

(52) U.S. Cl.
CPC ......... *H04L 2209/24* (2013.01); *H04L 2209/56* (2013.01)
USPC .......................................................... 380/28

(56) References Cited

U.S. PATENT DOCUMENTS

| | | | | |
|---|---|---|---|---|
| 2002/0073202 | A1* | 6/2002 | Wang | 709/227 |
| 2003/0028481 | A1 | 2/2003 | Flitcroft et al. | |
| 2003/0191719 | A1 | 10/2003 | Ginter et al. | |
| 2005/0132070 | A1 | 6/2005 | Redlich et al. | |
| 2008/0170693 | A1 | 7/2008 | Spies et al. | |
| 2009/0310778 | A1* | 12/2009 | Mueller et al. | 380/44 |
| 2010/0246813 | A1* | 9/2010 | Morris et al. | 380/28 |
| 2012/0128153 | A1* | 5/2012 | Golic | 380/45 |

OTHER PUBLICATIONS

Thomas Stutz and Andreas Uhl, "On Format-Compliant Iterative Encryption of JPEG2000," Proceedings of the Eighth IEEE International Symposium on Multimedia (ISM '06), 2006.
J. Black and P. Rogaway, "Ciphers with Arbitrary Finite Domains," [online]. Feb. 12, 2001 <URL:eprint.iacr.org/2001/012.ps>.
Pauker, Mathew J. et. al, U.S. Appl. No. 11/635,756, filed Dec. 6, 2006.
Brightwell, Michael et al., "Using Datatype-Preserving Encryption to Enhance Data Warehouse Security," 20th National Information Systems Security Conference, Oct. 7-10, 1997—Baltimore, Maryland.
Black, John et al. "Ciphers with Arbitrary Finite Domains," RSA Conference 2002, San Jose, CA, USA, Feb. 18-22, 2002, Proceedings, "Lecture Notes in Computer Science," 2271 Springer 2002, ISBN 3-540-43224-8, pp. 114-130.
Pauker, Matthew J. et al. U.S. Appl. No. 12/432,258, filed Apr. 29, 2009.
Burnett, Steven D. et al. U.S. Appl. No. 12/435,635, filed May 5, 2009.

\* cited by examiner

FORMAT PRESERVING ENCRYPTION METHODS FOR DATA STRINGS WITH CONSTRAINTS

BACKGROUND

This invention relates to cryptography and more particularly, to format-preserving cryptography.

Cryptographic systems are used to secure data in a variety of contexts. For example, encryption algorithms are used to encrypt sensitive information such as financial account numbers, social security numbers, and other personal information. By encrypting sensitive data prior to transmission over a communications network, the sensitive data is secured, even if it passes over an unsecured communications channel. Sensitive data is also sometimes encrypted prior to storage in a database. This helps to prevent unauthorized access to the sensitive data by an intruder.

Commonly used encryption algorithms include the Advanced Encryption Standard (AES) encryption algorithm and the Data Encryption Standard (DES) encryption algorithm. Using these types of algorithms, an organization that desires to secure a large quantity of sensitive information can place the sensitive information in a data file. The data file can then be encrypted in its entirety using the AES or DES algorithms.

Encrypting entire files of data can be an effective technique for securing large quantities of data. However, bulk encryption of files can be inefficient and cumbersome because it is not possible to selectively access a portion of the encrypted data in an encrypted file. Even if an application only needs to have access to a portion of the data, the entire file must be decrypted. Without the ability to selectively decrypt part of a file, it can be difficult to design a data processing system that provides different levels of data access for different application programs and for different personnel.

To avoid the difficulties associated with encrypting entire files of sensitive data, it would be desirable to be able to apply cryptographic techniques such as the AES and DES encryption algorithms with a finer degree of granularity. For example, it might be desirable to individually encrypt social security numbers in a database table, rather than encrypting the entire table. This would allow software applications that need to access information in the table that is not sensitive to retrieve the desired information without decrypting the entire table.

Conventional encryption techniques can, however, significantly alter the format of a data item. For example, encryption of a numeric string such as a credit card number may produce a string that contains non-numeric characters or a string with a different number of characters. Because the format of the string is altered by the encryption process, it may not be possible to store the encrypted string in the same type of database table that is used to store unencrypted versions of the string. The altered format of the encrypted string may therefore disrupt software applications that need to access the string from a database. The altered format may also create problems when passing the encrypted string between applications. Because of these compatibility problems, organizations may be unable to incorporate cryptographic capabilities into legacy data processing systems.

To address the problems associated with altering the format of a string during cryptographic operations, so-called format-preserving encryption (FPE) algorithms have been proposed. When an FPE algorithm is used to encrypt or decrypt a string in a given format, the format of the string is not changed during the encryption or decryption process. Although FPE algorithms can be helpful in avoiding the disruptions associated with altered string formats, the characteristics of strings that have been cryptographically processed using FPE algorithms may be changed sufficiently to give rise to incompatibilities with software applications. FPE algorithms are able to ensure that an encrypted or decrypted string will contain only valid characters, but may not maintain desired relationships between those characters. For example, the checksum value that is associated with a credit card number may no longer be valid after the credit card number has been encrypted using an FPE algorithm. As another example, a string whose digits are required to be monotonically ascending may no longer satisfy this requirement following encryption or decryption using an FPE algorithm. In other situations, it can be challenging to properly handle data in a database where it is not clear which data items have been encrypted using an FPE algorithm and which items have remained unencrypted.

It would therefore be desirable to provide improved ways in which to cryptographically process data in a system involving format preserving encryption (FPE) algorithms.

SUMMARY

Format-preserving encryption and decryption algorithms are provided. Using format preserving encryption, a plaintext string such as a string of letters and digits can be encrypted to produce ciphertext composed of letters and digits in the same format as the original plaintext string. During format preserving decryption, ciphertext can be converted into plaintext in the same format as the ciphertext. Format preserving encryption (FPE) cryptographic algorithms for encryption and decryption operations may be based on a block cipher.

During cryptographic operations, an FPE cryptographic algorithm may be applied to a string repeatedly. The string will be altered when the FPE algorithm is applied, but will maintain its original format. The string can be tested after each application of the FPE algorithm to determine whether a given set of desired string constraints have been satisfied. For example, the processed string can be analyzed to determine whether its checksum matches the checksum value of an original version of the string. If the checksum matches, further application of the FPE algorithm can be halted. Schemes in which the checksum of a plaintext string is always valid and in which the checksum of a ciphertext string is always invalid can be used to flag encrypted data.

Further features of the invention, its nature and various advantages will be more apparent from the accompanying drawings and the following detailed description of the preferred embodiments.

DETAILED DESCRIPTION

Figure 1:
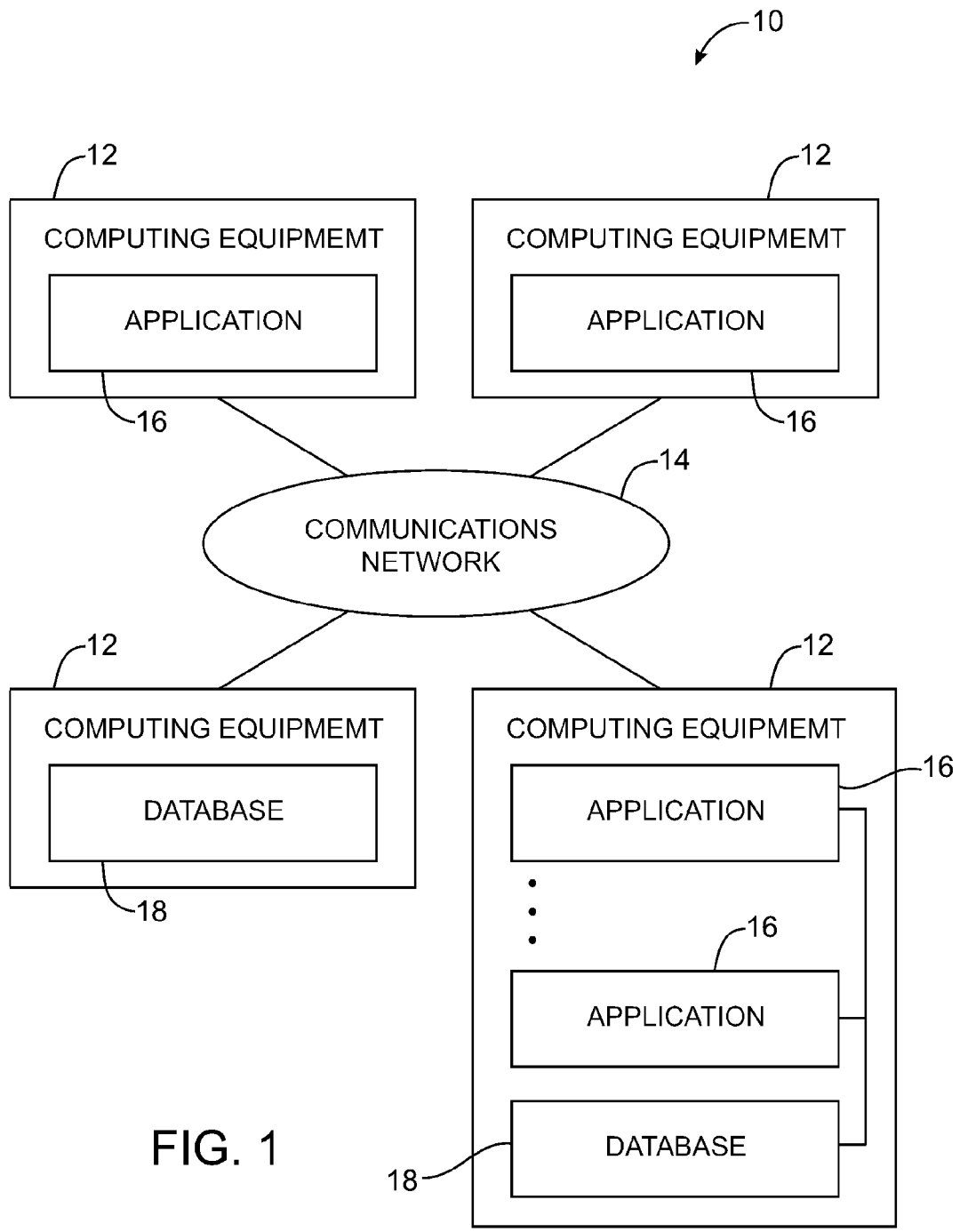
FIG. 1 is a diagram of an illustrative system environment in which cryptographic tools with format preserving encryption capabilities may be used in accordance with an embodiment of the present invention.

An illustrative cryptographic system 10 in accordance with the present invention is shown in FIG. 1. System 10 includes computing equipment 12 and communications network 14. The computing equipment 12 may include one or more personal computers, workstations, computers configured as servers, mainframe computers, portable computers, etc. The communications network 14 may be a local area network or a wide area network such as the internet. System 10 may be used in processing data for one or more organizations.

Computing equipment 12 may be used to support applications 16 and databases 18. In computing equipment 12 in which multiple applications run on the same computer platform, applications and databases may communicate with each other directly. If desired, applications 16 can communicate with each other and with databases 18 remotely using communications network 14. For example, an application 16 that is run on a computer in one country may access a database 18 that is located in another country or an application 16 running on one computer may use network 14 to transmit data to an application 16 that is running on another computer. Applications 16 may be any suitable applications, such as financial services applications, governmental record management applications, etc.

The data that is handled by system 10 includes sensitive items such as individuals' addresses, social security numbers and other identification numbers, license plate numbers, passport numbers, financial account numbers such as credit card and bank account numbers, telephone numbers, email addresses, etc. In some contexts, information such as individuals' names may be considered sensitive.

In a typical scenario, a credit card company maintains a database 18 of account holders. The database lists each account holder's name, address, credit card number, and other account information. Representatives of the credit card company may be located in many different geographic locations. The representatives may use various applications 16 to access the database. For example, a sales associate may retrieve telephone numbers of account holders to make sales calls using one application, whereas a customer service representative may retrieve account balance information using another application. Automated applications such as error-checking housekeeping applications may also require access to the database.

To prevent unauthorized access to sensitive data and to comply with data privacy regulations and other restrictions, sensitive data may need to be encrypted. Encryption operations may be performed before data is passed between applications 16 or before data is stored in a database 18. Because various applications may need to access different types of data, the system 10 preferably allows data to be selectively encrypted. As an example, each of the telephone numbers and each of the credit card numbers can be individually encrypted using separate cryptographic keys. With this type of selective encryption arrangement, applications that require access to telephone numbers need not be provided with access to credit card numbers and vice versa.

To support encryption and decryption operations in system 10 applications 16 may be provided with encryption and decryption engines. For example, an application 16 that accesses a database 18 over a communications network 14 may have an encryption engine for encrypting sensitive data before it is provided to the database 18 and stored and may have a decryption engine for use in decrypting encrypted data that has been retrieved from database 18 over communications network 14. As another example, a first application may have an encryption engine for encrypting sensitive data before passing the encrypted data to a second application. The second application may have a decryption engine for decrypting the encrypted data that has been received from the first application.

Any suitable technique may be used to provide applications 16 with encryption and decryption capabilities. For example, the encryption and decryption engines may be incorporated into the software code of the applications 16, may be provided as stand-alone applications that are invoked from within a calling application, or may be implemented using a distributed arrangement in which engine components are distributed across multiple applications and/or locations.

Figure 2:
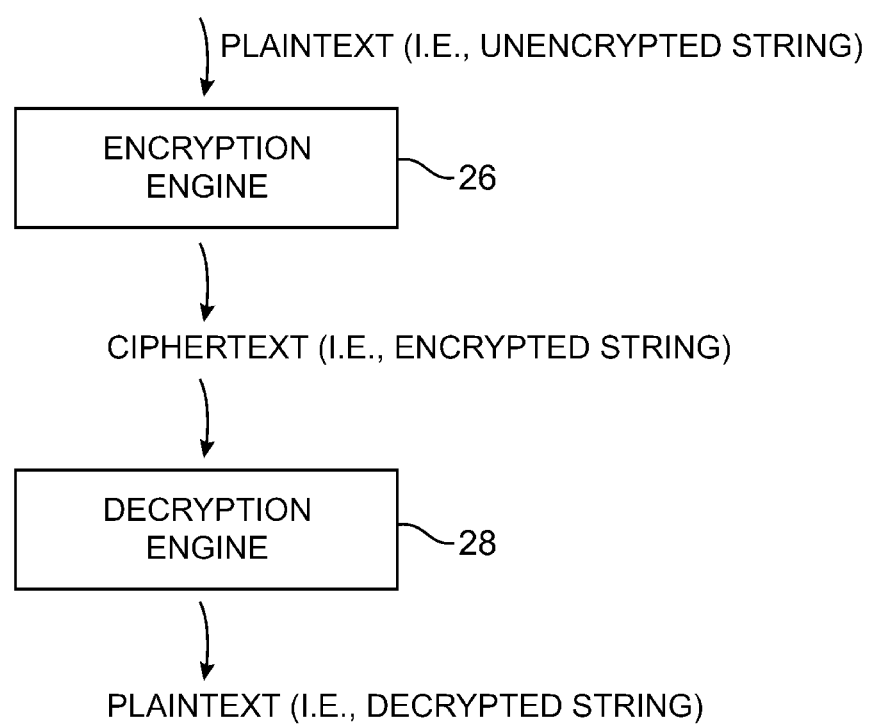
FIG. 2 is a diagram showing how encryption and decryption engines can preserve the format of a string during cryptographic processing operations in accordance with an embodiment of the present invention.

The data handled by the applications 16 and databases 18 of system 10 is represented digitally. The data includes strings of characters (i.e., names, addresses, account numbers, etc.). As shown in FIG. 2, during encryption operations, an encryption engine 26 that is implemented on the computing equipment of FIG. 1 encrypts unencrypted strings of characters (sometimes referred to as plaintext) into encrypted strings of characters (sometimes referred to as ciphertext). During decryption operations, a decryption engine 28 that is implemented on the computing equipment of FIG. 1 decrypts encrypted strings of characters to form unencrypted strings of characters.

The data strings that are handled in a typical data processing system have defined formats. For example, an identification number may be made up of three letters followed by ten digits. By using format preserving encryption (FPE) algorithms for supporting cryptographic operations, encryption engine 26 and decryption engine 28 are able to encrypt and decrypt strings without changing a string's format. For example, a plaintext identification number made up of three letters followed by ten digits can be encrypted to form corresponding ciphertext made up of three letters and ten digits. The ability to preserve the format of a data string greatly simplifies system operations and allows systems with legacy applications to be provided with cryptographic capabilities that would not be possible using conventional techniques.

Consider, as an example, the encryption and decryption of credit card numbers. Credit card numbers generally have between 13 and 18 digits. The format for a particular valid credit card number might require that the credit card number have 16 digits. These digits may include a leading group of system and bank identification numbers (e.g., six digits) and a group of account numbers (sometimes referred to as cardholder account information or personal account number information) and other number. There may be, for example, six digits of account number information. The last of the 16 digits may represent redundant information (e.g. a checksum).

In a 16-digit credit card number, the digits are typically organized in four groups of four each, separated by three spaces. During a format-preserving encryption operation, all or part of the unencrypted credit card number may be transformed into credit-card-formatted ciphertext. and during decryption, the ciphertext may be transformed back into the unencrypted credit card number. As an example, the personal account number may be encrypted and subsequently decrypted.

The value of a valid sixteenth digit in a credit card number can be formed by performing a checksum operation on the first 15 digits using the Luhn algorithm. With this type of arrangement, any single-digit error in the credit card number and most adjacent digit transpositions in the credit card number will alter the checksum value, so that data entry errors can be identified.

During encryption operations, the encryption engine 26 can retain the original checksum value from the credit card number. The encryption engine may then repeatedly apply a format preserving encryption (FPE) algorithm to a desired set of the credit card number digits such as the six cardholder account number digits (as an example). After each application of the FPE algorithm, the Luhn algorithm may be applied to calculate a new checksum. The new checksum may then be compared to the original checksum. Once the checksums match, further applications of the FPE algorithm are inhibited.

In some situations, it may be desirable to ensure maximum compatibility between the plaintext and ciphertext versions of the string. In environments such as these, the ciphertext that results from repeated application of the FPE algorithm can be stored in a database or otherwise used by applications 16 without further modification. Because the use of the FPE algorithm does not alter the format of the ciphertext relative to that of the plaintext and because the new checksum represents a valid value, the ciphertext can be used by applications 16 just as if it were an unencrypted value.

In other situations, it may be desirable to configure encryption engine 26 so that the ciphertext includes a checksum value that is necessarily invalid. This may be accomplished by replacing the valid checksum value in the ciphertext with an invalid checksum value. For example, following repeated applications of the FPE algorithm to produce a ciphertext string with a valid checksum that matches the original checksum, a linear positive or negative offset or other predetermined mapping arrangement may be used to convert the valid checksum into an invalid checksum. As an example, the number "1" may be added to the valid checksum of a string (modulo 10) to produce a known invalid checksum. When applications 16 retrieve the ciphertext string and its associated checksum from a database or otherwise use the ciphertext, the incorrect checksum value may serve as a tag that identifies the ciphertext as being encrypted and as not representing an unencrypted plaintext credit card number.

The FPE algorithm that is implemented using the encryption and decryption engines 26 and 28 can use index mappings to relate possible character values in a given string position to corresponding index values in an index. By mapping string characters to and from a corresponding index, the encryption and decryption engines 26 and 28 are able to perform encryption and decryption while preserving string formatting.

In a typical scenario, an index mapping may be formed using a table having two columns and a number of rows. The first column of the mapping corresponds to the potential character values in a given string position (i.e., the range of legal values for characters in that position). The second column of the mapping corresponds to an associated index. Each row in the mapping defines an association between a character value and a corresponding index value.

Consider, as an example, a situation in which the string being encrypted has first, fifth, sixth, and seventh string characters that are digits and second, third, and fourth characters that are uppercase letters. In this situation, the possible character values in the first, fifth, sixth, and seventh character positions within the plaintext version of the string might range from 0 to 9 (i.e., the first character in the string may be any digit from 0 through 9, the fifth character in the string may be any digit from 0 to 9, etc.). The possible character values in the second, third, and fourth positions in the string range from A to Z (i.e., the second character in the unencrypted version of the string may be any uppercase letter in the alphabet from A to Z, the third character in the unencrypted version of the string may be any uppercase letter from A through Z, etc.).

The index mapping in this type of situation may map the ten possible digit values for the first, fifth, sixth, and seventh string characters into ten corresponding index values (0 . . . 9). For the second, third, and fourth character positions, 26 possible uppercase letter values (A . . . Z) may be mapped to 26 corresponding index values (0 . . . 25).

In a typical string, not all characters have the same range of potential character values. If there are two ranges of potential character values, two index mappings may be used, each of which maps a different set of possible character values to a different set of index values. If there are three ranges of potential character values within the string, three index mappings may be used. For example, a first index mapping may relate a digit character to a first index, a second index mapping may relate a uppercase letter character to a second index, and a third index mapping may relate an alphanumeric character to a third index. In strings that contain a larger number of different character types, more index mappings may be used.

In general, a string contains a number of characters N. The potential character values in the string are related to corresponding index values using index mappings. An index mapping is created for each character. The indexes used to represent each character may have any suitable size. For example, an index containing 52 index values may be associated with string characters with character values that span both the uppercase and lowercase letters. Because not all of the characters typically have the same range of potential character values, there are generally at least two different index mappings used to map character values in the string to corresponding index values. In a string with N characters, N index mappings are used, up to N of which may be different index mappings.

Any suitable cryptographic formulation may be used for the format-preserving encryption and decryption engines 26 and 28, provided that the cryptographic strength of the encryption algorithm is sufficiently strong. With one suitable approach, the FPE algorithm used by the encryption engine 26 and decryption engine 28 is based on the well known Luby-Rackoff construction. The Luby-Rackoff construction is a method of using pseudo-random functions to produce a pseudo-random permutation (also sometimes referred to as a block cipher). A diagram showing how encryption engine 26 and decryption engine 28 may implement an FPE algorithm using the Luby-Rackoff construction is shown in FIG. 3.

During encryption operations, an unencrypted string is divided into two portions. The unencrypted string may be divided into two portions using any suitable scheme. For example, the string may be divided into odd and even portions by selecting alternating characters from the string for the odd portion and for the even portion. With another suitable approach, the unencrypted string is divided into two portions by splitting the string into left and right halves.

Figure 3:
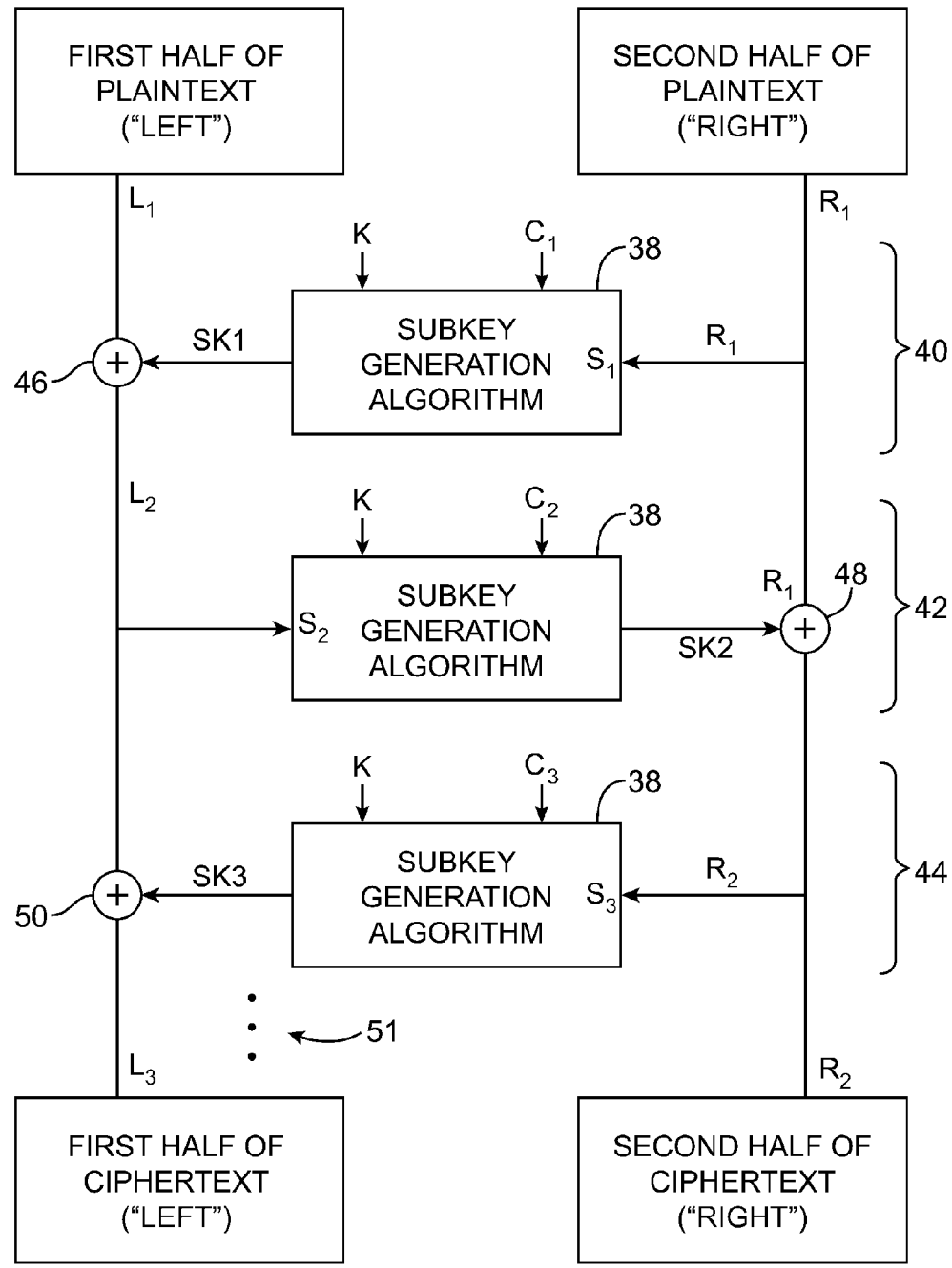
FIG. 3 is a diagram of an illustrative format-preserving block cipher that may be used in a format preserving encryption algorithm during data encryption and decryption in accordance with an embodiment of the present invention.

In FIG. 3, the first half of the unencrypted string is labeled "$L_1$" and the second half of the unencrypted string is labeled "$R_1$". During encryption operations with encryption engine 26, the unencrypted string halves $L_1$ and $R_1$ are processed to form corresponding encrypted string halves $L_3$ and $R_2$. During decryption operations with decryption engine 28, processing flows from the bottom of FIG. 3 towards the top, so that encrypted string halves $L_3$ and $R_2$ are decrypted to produce unencrypted halves $L_1$ and $R_1$. Processing occurs in three rounds 40, 42, and 44. During encryption, the operations of round 40 are performed first, the operations of round 42 are performed second, and the operations of round 44 are performed third. During decryption, the operations of round 44 are performed first, the operations of round 42 are performed second, and the operations of round 40 are performed third.

As indicated by dots 51 in FIG. 3, the operations of FIG. 3 may, if desired, be implemented using four or more rounds. For example, eight rounds of a block cipher may be performed.

The block cipher structure of FIG. 3 encrypts (or decrypts) a string of a particular known size to produce an output string of the same size. During encryption, plaintext is converted to ciphertext (i.e., the block cipher of FIG. 3 is operated from top to bottom). During decryption, ciphertext is converted to plaintext (i.e., the block cipher of FIG. 3 is operated from bottom to top).

The block cipher uses a subkey generation algorithm 38. The subkey generation algorithm 38 has three inputs: a key K, a constant C ($C_1$ for round 40, $C_2$ for round 42, and $C_3$ for round 44), and a string S ($S_1=R_1$ for round 40, $S_2=L_2$ for round 42, and $S_3=R_2$ for round 44).

The subkey generation algorithm 38 may be a function H' that is based on a cryptographic hash function H and that takes as an input S, C, and K. With one suitable approach, the subkey generation algorithm H' is given by equation 1.

$$H'=H(S|C|K) \tag{1}$$

In equation 1, the symbol "|" represents the concatenation function. The cryptographic hash function H is preferably chosen so that the subkey generation algorithm has a suitable cryptographic strength. Illustrative cryptographic hash functions that can be used for hash function H include the SHA1 hash function and the AES algorithm used as a hash function.

The value of the key K is the same for rounds 40, 42, and 44. The value of the constant C is different for each round. With one suitable arrangement, the constant $C_1$ that is used in round 40 is equal to 1, the constant $C_2$ that is used in round 42 is 2, and the constant $C_3$ that is used in round 44 is 3. The value of S varies in each round. In round 40, $S_1$ is equal to the first half of the unencrypted string $R_1$. In round 42, $S_2$ is equal to the $L_2$. In round 44, $S_3$ is equal to $R_2$.

In round 40, the output of the subkey generation algorithm is subkey SK1, as shown in equation 2.

$$SK1=H(S_1|C_1|K) \tag{2}$$

In round 42, the output of the subkey generation algorithm is subkey SK2, as shown in equation 3.

$$SK2=H(S_2|C_2|K) \tag{3}$$

In round 44, the output of the subkey generation algorithm is subkey SK3, as shown in equation 4.

$$SK3=H(S_3|C_3|K) \tag{4}$$

Equations 1-4 involve the use of a cryptographic hash function for the subkey generation algorithm. If desired, the subkey generation algorithm may be implemented using a cryptographic message authentication code (MAC) function. A cryptographic message authentication code function is a keyed hash function. Using a cryptographic message authentication code function, equation 1 would become H'=MACF (S|C,K), where MACF is the message authentication code function. An example of a message authentication code function is CMAC (cipher-based MAC), which is a block-cipher-based message authentication code function. The cryptographic message authentication code function AES-CMAC is a CMAC function based on the 128-bit advanced encryption standard (AES).

A format-preserving combining operation (labeled "+" in FIG. 3) is used to combine the subkeys SK1, SK2, and SK3 with respective string portions.

During encryption operations, format-preserving combining operation 46 combines SK1 with string $L_1$ to produce string $L_2$. During decryption operations, format-preserving combining operation 46 combines SK1 with string $L_2$ to produce string $L_1$. Format-preserving combining operation 48 combines SK2 with string $R_1$ to produce string $R_2$ during encryption operations and combines SK2 with string $R_2$ to produce string $R_1$ during decryption operations. Format-preserving combining operation 50 is used to process subkey SK3. During encryption, format-preserving combining operation 50 combines SK3 with string $L_2$ to produce string $L_3$. During decryption, format-preserving combining operation 50 combines SK3 with string $L_3$ to produce string $L_2$.

The format-preserving combining operation+preserves the format of the strings $L_1$, $L_2$, $L_3$, $R_1$, and $R_2$ as they are combined with the subkeys SK1, SK2, and SK3. For example, the string $L_2$ that is produced by combining string $L_1$ and subkey SK1 has the same format as the string $L_1$.

The format-preserving combining operation+may be based on any suitable mathematical combining operation. For example, the function+may be addition mod x or the function+may be multiplication mod x, where x is an integer of an appropriate size (i.e., $x=y^z$, where z is equal to the length of the string S, and where y is equal to the number of possible character values for each character in the string S). If, as an example, the string S contains 16 digits (each digit having one of 10 possible values from 0 to 9), x would be $10^{16}$. If the string S contains three uppercase letters (each uppercase letter having one of 26 possible values from A to Z), x would be $26^3$. These are merely illustrative examples. The format-preserving combining function+may be any reversible logical or arithmetic operation that preserves the format of its string input when combined with the subkey.

Figure 4:
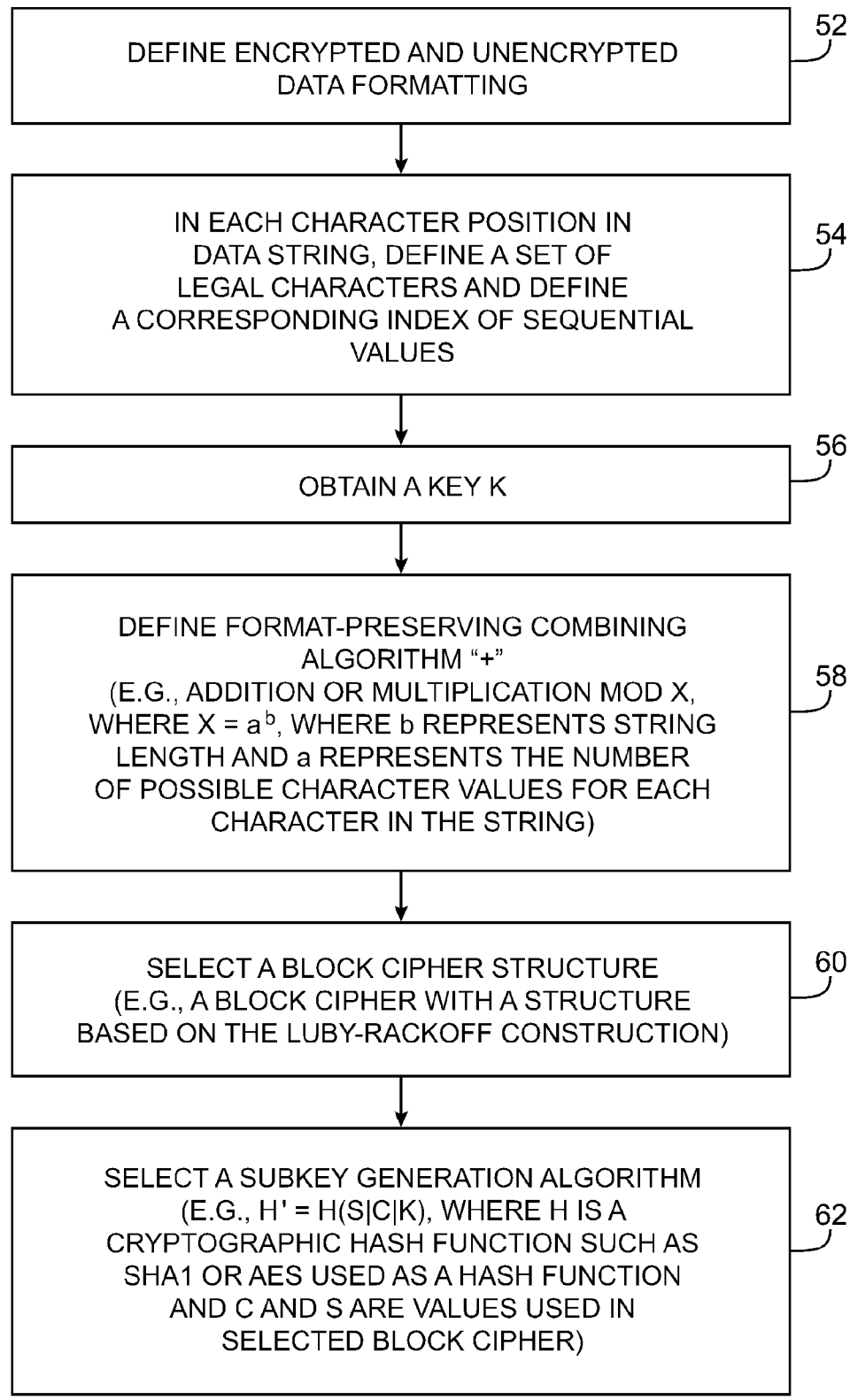
FIG. 4 is a flow chart of illustrative steps that may be used in setting up format preserving encryption and decryption engines for use in a data processing system of the type shown in FIG. 1 in accordance with an embodiment of the present invention.

Illustrative steps involved in setting up a format preserving encryption (FPE) algorithm for use by encryption engine 26 and decryption engine 28 are shown in FIG. 4. At step 52, the desired formatting to be used by the FPE algorithm for encrypted and decrypted strings is defined.

For example, an unencrypted strings may have the format ddd-dddd, where d is a digit from 0 to 9. The encryption engine 26 may produce corresponding encrypted strings with the identical format.

At step 54, for each character in the string, an index mapping is created by defining a set of legal character values and a corresponding index of sequential values that is associated with the legal characters values. For example, if the legal characters for a particular character position in a string include the 10 digits (0 . . . 9) and the 26 lowercase letters (a . . . z), a suitable indexing scheme associates digits 0 through 9 with index values 1 through 10 and associates letters a through z with index values 11-36. In this index mapping, the index values that are created are all adjacent. Because there are no gaps in the indices, index value 10 is adjacent to index value 11 (in the present example). If the string contains more than one type of character, there will be more than one index mapping associated with the characters in the string.

At step 56, a value for key K is obtained. The value of K may be obtained, for example, by generating K from a root secret and other information using a key generation algorithm in key server 20.

At step 58, the format-preserving combining operation "+" is defined. As described in connection with FIG. 3, the format-preserving combining operation may be addition modulo x, multiplication modulo x, or any other suitable logical or arithmetic operation that preserves the format of the string when combining the string with a subkey and that is reversible.

At step 60, a block cipher structure is selected for the encryption engine 26 and decryption engine 28. The block cipher structure may, for example, by a Luby-Rackoff construction of the type described in connection with FIG. 3. Other suitable block cipher structures may be used if desired.

At step 62, a subkey generation algorithm is selected. Suitable subkey generation algorithms include those based on cryptographic hash functions such the SHA1 hash function and AES algorithm used as a hash function. Suitable subkey generation algorithms also include those built on cryptographic message authentication code functions such as AES-CMAC.

After performing the setup steps of FIG. 4, the FPE algorithm may be run by encryption engine 26 and decryption engine 28 (e.g., using the computing equipment of system 10 of FIG. 1).

Figure 5:
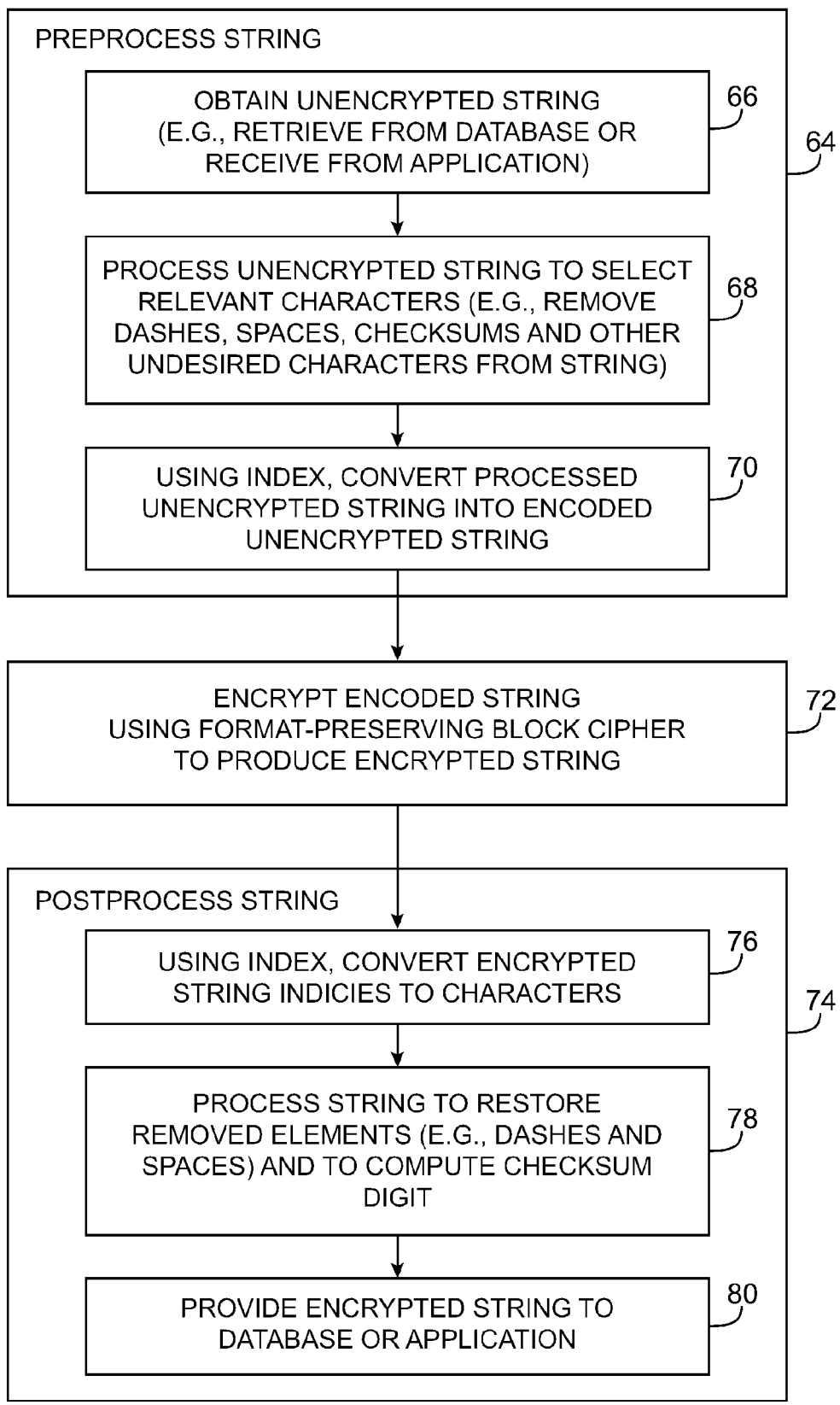
FIG. 5 is a flow chart of illustrative steps involved in using an encryption engine that implements a format preserving encryption algorithm to encrypt a data string in accordance with an embodiment of the present invention.
Figure 6:
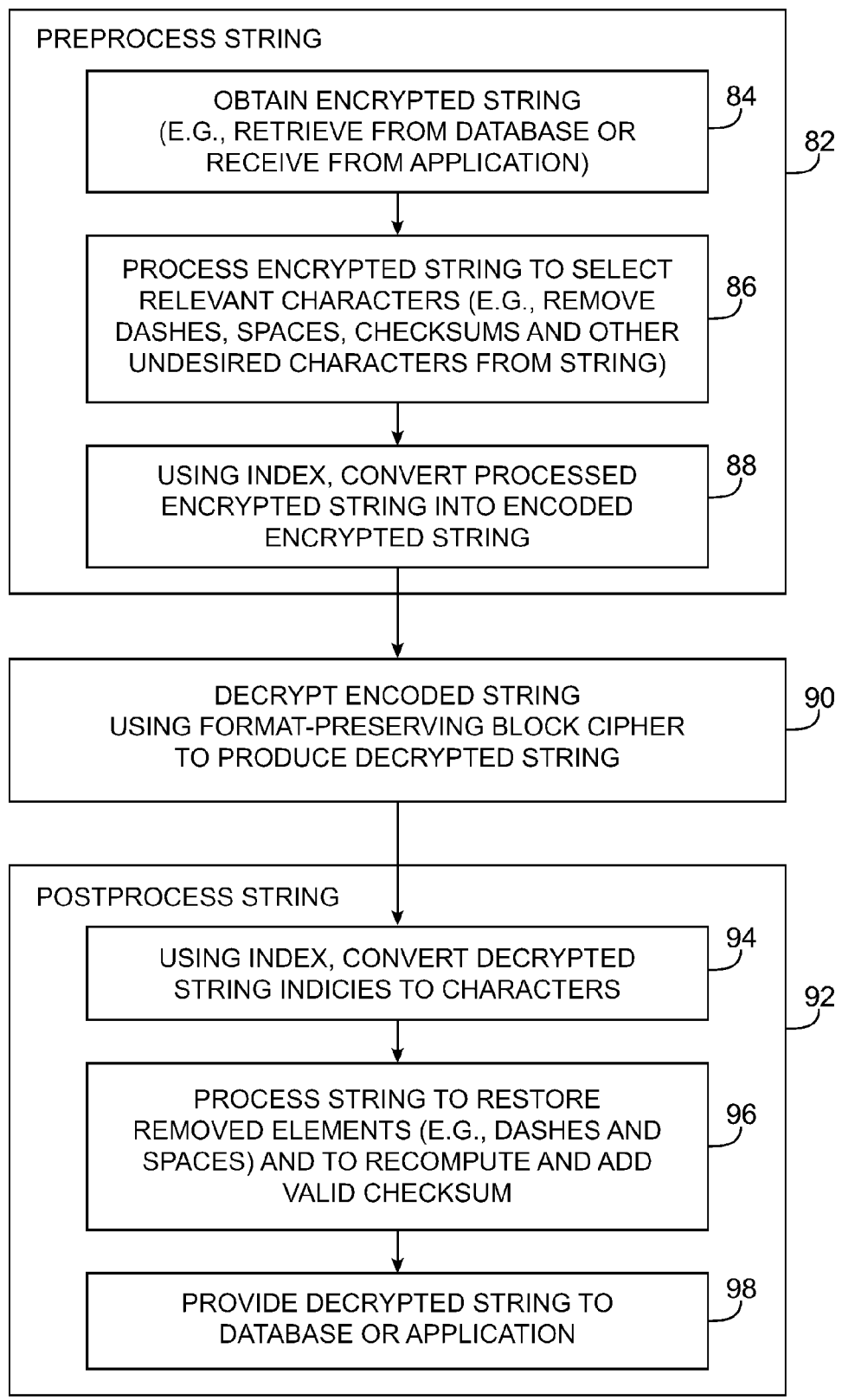
FIG. 6 is a flow chart of illustrative steps involved in using a decryption engine that implements a format preserving encryption algorithm to decrypt a data string in accordance with an embodiment of the present invention.

Illustrative steps involved in using the encryption engine 26 and decryption engine 28 when processing strings of data in system 10 are shown in FIGS. 5 and 6. As described in connection with FIGS. 1 and 2, the encryption engine 26 and decryption engine 28 may be called by an application or may be part of an application 16 that is running on data processing system 10. The data strings that are encrypted and decrypted may be strings that are retrieved from and stored in fields in a database 18 or may be strings that are passed between applications 16 (e.g., applications 16 that are running on the same computing equipment 12 or that are communicating remotely over a communications network 14).

The flow chart of FIG. 5 shows steps involved in encrypting a data string using the FPE algorithm that was set up during the operations of FIG. 4.

As shown in FIG. 5, the data string is preprocessed at step 64, encrypted at step 72, and postprocessed at step 74.

At step 66, the encryption engine obtains the unencrypted string. The string may be retrieved from a database 18 or received from an application 16.

At step 68, the string is processed to identify relevant characters. During step 68, dashes, spaces, and other undesired characters can be removed from the string and the relevant characters in the string can be retained.

For example, if the string is a number that contains digits separated by a dash, the string can be processed to remove the dash. Although the dash could be left in the string, there is no purpose in encrypting a dash character in the unencrypted string to produce a corresponding dash character in the encrypted string (as would be required to preserve the format of the entire string).

At step 70, the encryption engine 26 uses the index mappings that were created during step 54 of FIG. 4 to convert the processed string (i.e., the string from which the irrelevant characters have been removed) into an encoded unencrypted string. For example, consider a number in which the first, fifth, sixth, and seventh character positions contain digits (i.e., numbers from 0 through 9) and the second, third, and fourth character positions contain uppercase letters. An index mapping may be used to convert the character values in the first, fifth, sixth, and seventh character positions into corresponding index values ranging from 0 through 9. Another index mapping may be used to convert the character values in the second, third, and fourth character positions into corresponding index values ranging from 0 through 25. The index values used in each index mapping may be sequential. Once the characters have been encoded using the sequential index values, processing can continue at step 72.

At step 72, the encryption engine 26 encrypts the encoded string using the format-preserving block cipher that was established during the operations of FIG. 4. For example, the encryption engine 26 can perform the Luby-Rackoff encryption operations described in connection with FIG. 3. During step 72, the subkey generation algorithm that was selected at step 62 of FIG. 4 and the format-preserving combining algorithm+that was defined at step 58 of FIG. 4 are used to transform the unencrypted encoded string into an encrypted encoded string.

At step 76, the same index mappings that were used during the encoding operations of step 70 are used to convert the index values of the encrypted string back into characters (i.e., characters in the legal set of character values that were defined for each character position at step 54). Decoding the encoded version of the string using the index mappings returns the string to its original character set.

At step 78, the decoded encrypted string is processed to restore elements such as dashes and spaces that were removed at step 68. The decoded encrypted string is ciphertext that corresponds to the plaintext unencrypted string that was obtained at step 66.

By processing the string at step 78, the extraneous elements of the string that were removed at step 68 are inserted back into the string. Because the extraneous elements are reinserted into the string and because a format-preserving block cipher was used in step 72, the encrypted string that is produced will have the same format as the original unencrypted string. This allows the encrypted string to be used by applications 16 and databases 18 that require that the original string's format be used.

At step 80, the encrypted string is provided to an application 16 or database 18. Legacy applications and databases that require a specific string format may be able to accept the encrypted string.

Illustrative steps involved in using decryption engine 28 to decrypt a string that has been encrypted using the process of FIG. 5 are shown in FIG. 6. The flow chart of FIG. 6 shows operations involved in decrypting a data string using the FPE algorithm that was set up during the operations of FIG. 4. The decryption engine 28 may be invoked by an application 16 or may be part of an application 16 that is running on data processing system 10. The data string that is being decrypted in the process of FIG. 6 may be an encrypted string that has been retrieved from a database 18 or may be a string that has been retrieved from an application.

As shown in FIG. 6, the encrypted data string is preprocessed at step 82, is decrypted at step 90, and postprocessed at step 92.

At step 84, the decryption engine obtains the encrypted string. The encrypted string may be retrieved from a database 18 or received from an application 16.

At step 86, the encrypted string is processed to identify relevant characters. During step 86, dashes spaces, and other extraneous elements can be removed from the string. The relevant characters in the string are retained. The process of removing extraneous characters during step 86 is the same as that used during the processing of the unencrypted string that was performed during step 68 of FIG. 5.

At step 88, the decryption engine 26 uses the index mappings that were defined at step 54 of FIG. 4 and that were used during the encryption operations of FIG. 5 to convert each of the characters of the processed encrypted string (i.e., the encrypted string from which the extraneous characters have been removed) into an encoded encrypted string. If, as an example, the legal set of characters associated with the first character of the encrypted string is defined as the set of 10 digits, a 10 digit index may be used to encode the first character of the encrypted string. If the legal set of characters associated with the second character of the encrypted string is defined as the set of 26 uppercase letters, a 26-digit index may be used to encode the second character of the encrypted string. During step 88, each character of the string is converted to a corresponding index value using an appropriate index mapping.

At step 90, the encoded version of the encrypted string is decrypted. The decryption engine 28 decrypts the string using the format-preserving block cipher that was established during the operations of FIG. 4. For example, the decryption engine 26 can perform the Luby-Rackoff decryption operations described in connection with FIG. 3. During step 90, the subkey generation algorithm that was selected at step 62 of FIG. 4 and the format-preserving combining algorithm+that was defined at step 58 of FIG. 4 are used to transform the encrypted encoded string into a decrypted encoded string.

At step 94, the index mappings that were used during the encoding operations of step 88 are used to convert the index values of the decrypted string back into their associated characters (i.e., characters in the legal set of character values that were defined for each character position at step 54). This returns the decrypted string to its original character set. In strings that contain more than one different type of character, multiple different index mappings are used.

At step 96, the decoded decrypted string is processed to restore elements such as dashes and spaces that were removed at step 88.

During the string processing operations of step 96, the extraneous elements of the string that were removed at step 88 are inserted back into the string. This restores the string to its original unencrypted state (i.e., the state of the string when obtained at step 66 of FIG. 5).

At step 98, the decrypted string is provided to an application 16 or database 18.

By incorporating format-preserving encryption and decryption engines 26 and 28 into data processing system 10, legacy applications and databases and other applications and databases can be provided with cryptographic capabilities without disrupting their normal operation.

The key K that is used by encryption and decryption engines 26 and 28 may be produced using any suitable technique. For example, key K may be supplied to a key server in system 10 manually and may be distributed to encryption and decryption engines 26 and 28 in satisfaction of valid key requests. Key K can be derived mathematically from a secret. The secret, which is sometimes referred to as a root secret, may be maintained at a key server in system 10. The root secret may be supplied to the key server manually or may be produced using a pseudo-random number generator.

During string preprocessing operations (e.g., the encoding operations of step 70 of FIG. 5 and step 88 of FIG. 6), it may be desirable to convert characters into unique binary values. These unique binary values may then be encrypted (as described in connection with the FPE encryption operations of step 72 of FIG. 5) or decrypted (as described in connection with the FPE decryption operations of step 90 of FIG. 6).

Figure 7:
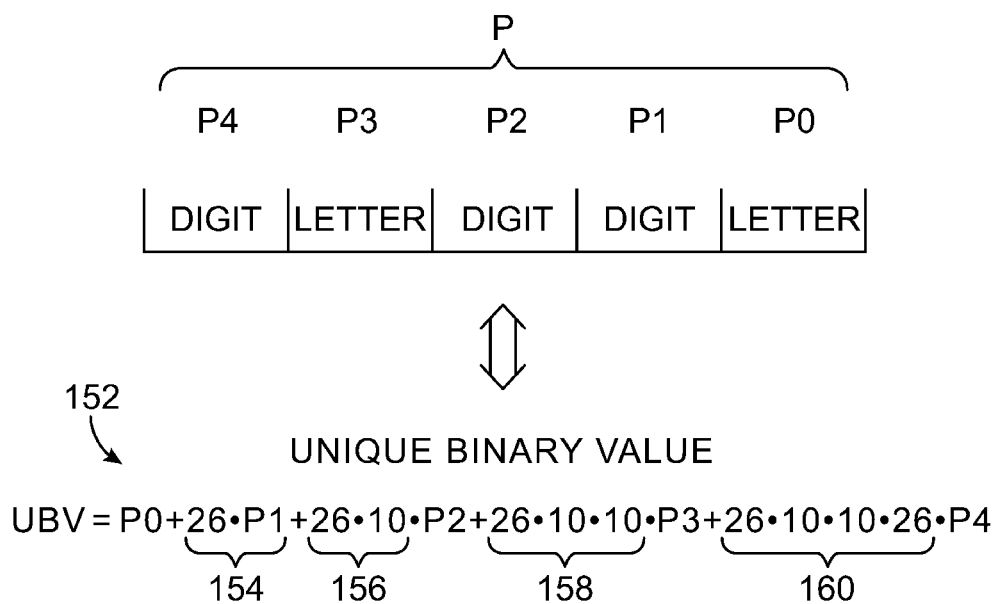
FIG. 7 is a diagram showing how a string may be represented as a unique binary value in accordance with an embodiment of the present invention.

One type of technique that may be used when encoding strings as unique binary values is illustrated in FIG. 7. In the example of FIG. 7, an unencoded (plaintext) string P is converted into a unique binary value UBV. String P (in this example) is made up of characters P4, P3, P2, P1, and P0. Characters P4, P2, and P1 are digits and may therefore have any value between 0 and 9 (i.e., 0 1, 2, 3, ... 9). Characters P3 and P0 are letters and may have any letter value (i.e., A, B, C, D, ... Z). Each digit character may have one of ten values and each letter character may have one of 26 values. To uniquely convert string P to binary, a formula such as formula 152 may be used.

In formula 152, P0 represents a numeric value for letter P0. In a typical indexing scheme for letters, "A" corresponds to 0, "B" corresponds to 1, ... and "Z" corresponds to 25, so if P0 is the letter "B," the numeric value for P0 in equation 152 will be 1. P1 is a digit. In a typical encoding scheme for digits, 0 corresponds to 0, 1 corresponds to 1, ... and 9 corresponds to 9, so if P1 is the digit "3," the value of P1 will be 3. Using an encoding scheme of this type, character P2 will have a numeric value of 0 to 9, P3 will have a numeric value of 0 to 25, and P4 will have a numeric value of 0 to 9.

As shown in formula 152, the numeric values of the characters P0, P1, P2, P3, and P4 are multiplied by respective coefficients 154, 156, 158, and 160 (the coefficient of P0 is "1"). The value of each multiplicative coefficient in formula 152 represents the number of possible values of the previous character. For example, in formula 152, the numeric value of character P1 is multiplied by coefficient 154. The value of coefficient 154 is 26, because P0 (the character that is just prior to character P1 in string P) may have any one of 26 possible values. Coefficient 156 of numeric value P2 has a value of 260, because the combination of preceding characters P0 and P1 could have any of 260 possible values. Likewise, the value of coefficient 158 of P3 is 2600 because there are 2600 possible combinations of numeric values for preceding characters P0, P1, and P2 and the value of coefficient 160 of P4 is 67600 because there are 67600 possible combinations of numeric values for preceding characters P0, P1, P2, and P3. Although the numbers in the coefficients in FIG. 7 are represented in base 10 for clarity, when computing the unique binary value UBV, the base 10 numeric values of the coefficients and the numeric values of the encoded characters (e.g., the numeric values of the digits and letters of string P) are represented in binary (i.e., in base 2, as "1s" and "0s"). The mapping provided by unique binary value encoding function 152 is unique in that no two character strings PA and PB will map to the same binary value UBV, when PA is not the same as PB.

To ensure that the FPE algorithm employed during the operations of FIGS. 5 and 6 is successful at preserving the format of a binary-encoded string, care should be taken that the binary values that are produced during encryption and decryption operations are format compliant. The encrypted version of the binary-encoded string that is produced at the output of step 72 in FIG. 5 should be format compliant to ensure that the postprocessed string that is produced at the output of step 74 of FIG. 5 is in the same format as the string originally obtained at step 66. Similarly, the decrypted version of the binary-encoded string that is produced at the output of step 90 of FIG. 6 should be format compliant to ensure that the postprocessed string produced following the operations of step 92 of FIG. 6 is in the same format as the string originally obtained at step 84.

Encoded binary values are considered to be format compliant when their unencoded form lies within the same range of values as their original form. Consider, as an example, the character "9". This character is a digit and can be numerically represented by the base 10 number "9." In binary, the number 9 is 1001. Using a block cipher of the type described in connection with FIG. 3, encryption operations may be performed that transform the unencrypted binary value 1001 to an encrypted value of 1111 (as an example). This binary value is not format compliant, because it corresponds to a base 10 value of "15," which is not within the permissible range for a single digit (i.e., "15" does not lie within the range of "0," "1", "2," . . . "9"). The same type of problem can occur during decryption if the decrypted version of a binary-encoded value at the output of step 90 is not format compliant.

To ensure that encrypted and decrypted values are format compliant, the block cipher operations of step 72 (FIG. 5) and step 90 (FIG. 6) can be repeated while checking the output of the cipher for format compliance. Each iteration of the block cipher will modify the binary output. Eventually, the binary output of the block cipher will be format compliant, at which point no further iterations of the block cipher are performed.

Figure 8:
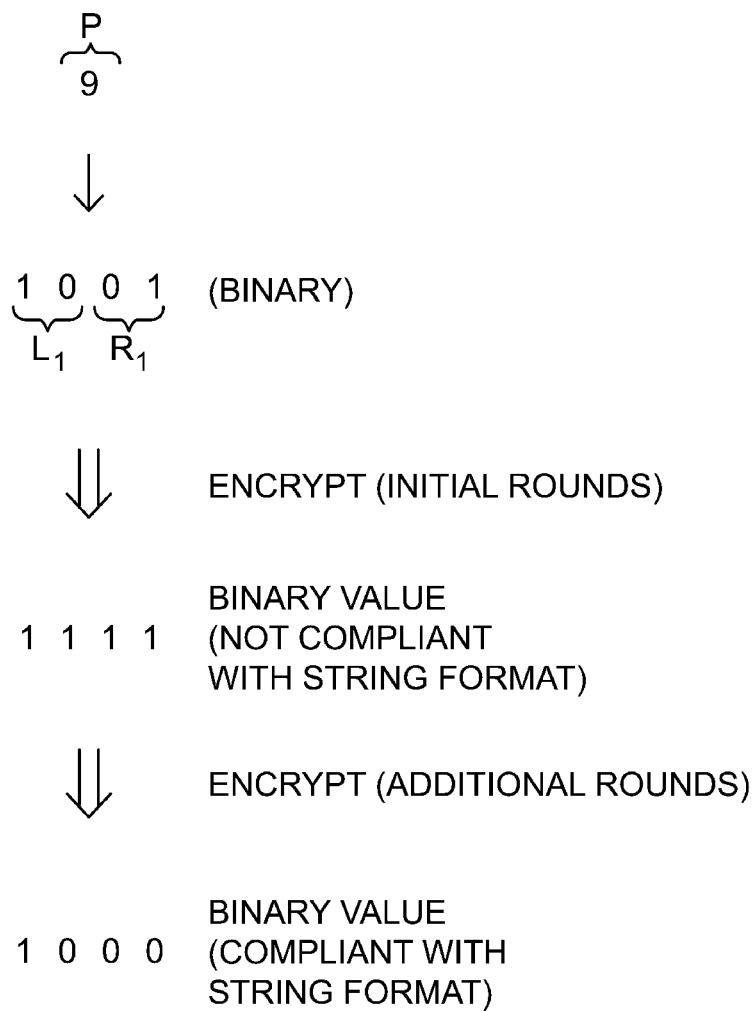
FIG. 8 is a diagram showing how a string format may be preserved when converting a string to a binary value in accordance with an embodiment of the present invention.

This type of arrangement is shown in FIG. 8. In the example of FIG. 8, an unencrypted string P is being encrypted. The string P in the FIG. 8 example is the digit "9." Using an index in which digits are mapped to corresponding numeric values (i.e., "0" is mapped to "0," "1" is mapped to "1," . . . and "9" is mapped to "9), the string P is converted to a numeric value of 9. In binary-encoded format, the unencrypted encoded version of string P is 1001. As shown in FIG. 8, the left half of the binary-encoded version of P ("10") is used as the input L1 to the block cipher of FIG. 3 and the right half of the binary-encoded version of P ("01") is used as the input R1 to the block cipher of FIG. 3.

As described in connection with FIG. 3, a certain number of rounds of the block cipher (e.g., eight rounds) may be used to perform an initial encryption operation on the binary-encoded value 1001. In the FIG. 8 example, this initial encoding operation results in the binary value of 1111. If this value were format compliant, the encryption process would be complete. However, in the present example, the binary value of 1111 is not format compliant, because it corresponds to a base 10 numeric value of 15, which is not within the permissible range numeric values for a digit (i.e., 15 does not lie within the range of 0-9, so the string "15" is not in the same format as the original string "9"). As a result, additional rounds of the block cipher are performed (e.g., an additional eight rounds). This produces the encrypted binary value 1000 (in the FIG. 8 example). Because the binary value 1000 corresponds to a base 10 numeric value of 8, which lies within the permissible digit numeric values of 0-9, the binary value 1000 forms a proper format-compliant encrypted binary-encoded version of string P. No further rounds of the block cipher need be performed.

Decryption operations may be performed in the same way. If, following an initial application of a given number of rounds of the block cipher, the initial binary value of a string that is produced is not format compliant, additional decryption operations can be performed. As soon as a binary output is produced that is format compliant, the block cipher operations may be terminated and the binary value may be converted into an appropriately formatted string of characters (e.g., letters and digits), as described in connection with step 92.

Figure 9:
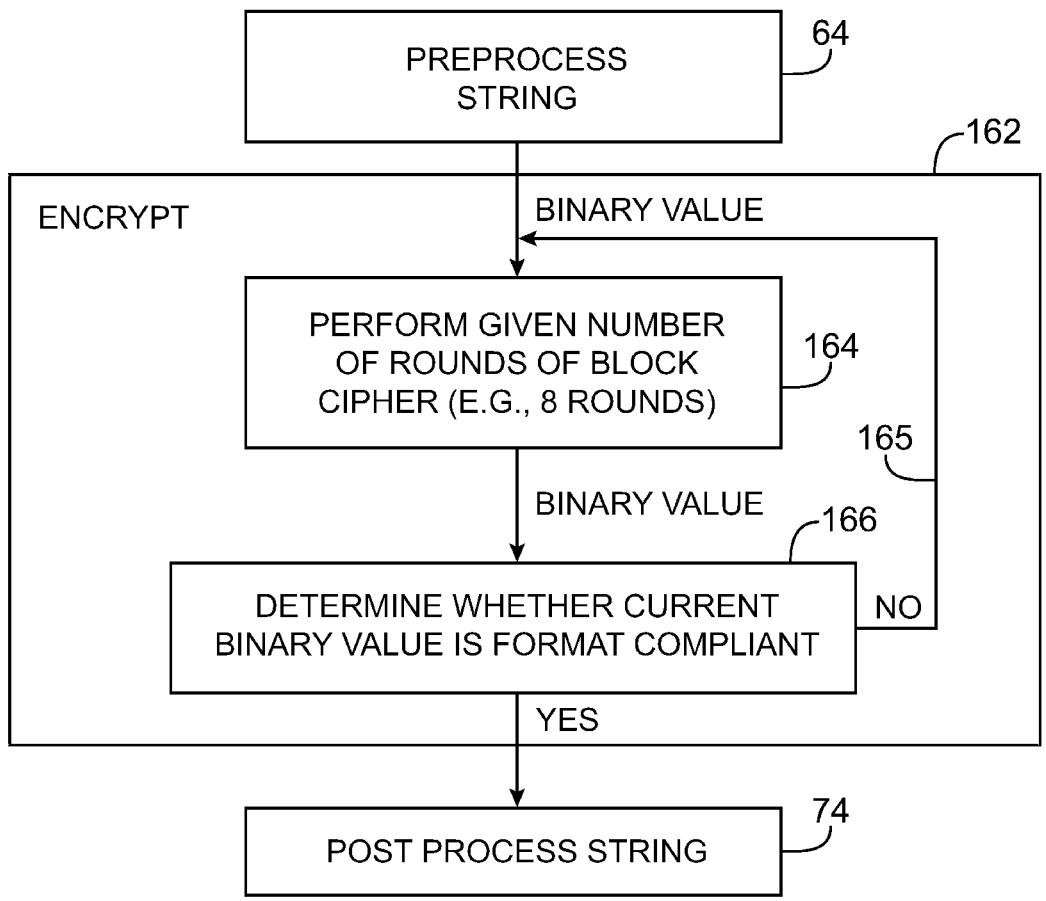
FIG. 9 a flow chart of illustrative steps involved in using a format preserving encryption algorithm to encrypt a data string represented using a unique binary value in accordance with an embodiment of the present invention.

Illustrative steps involved in performing format-preserving encryption operations on a string using one or more repeated iterations of a block cipher to ensure format compliance are shown in FIG. 9.

As shown in FIG. 9, a data string may be preprocessed at step 64, encrypted at step 162, and postprocessed at step 74.

As described in connection with steps 66, 68, and 70 of FIG. 5, during step 64, encryption engine 26 may obtain the unencrypted string from a database 18 or an application 16 and may process the string to identify relevant characters. Dashes, spaces, and other undesired characters can be removed from the string and the relevant characters in the string can be retained. The string that is obtained at step 64 may represent part of a larger data item. For example, the sting may be formed from a subset of the characters in a string that has been retrieved from a database.

Encryption engine 26 may use the index mappings that were created during step 54 of FIG. 4 to convert the processed string (i.e., the string from which the irrelevant characters have been removed) into an encoded unencrypted string. For example, each digit in the string may be converted into a corresponding numeric value from 0-9, each letter in the string may be converted into a corresponding numeric value from 0-25, etc. During these encoding operations, encryption engine 26 may use a formula such as formula 152 of FIG. 7 to encode the string to a unique binary value. The actual formula that is used during encoding depends on the nature of the string's format. The values used for coefficients 154, 156, 158, and 160 in FIG. 7 are applicable to a situation in which the string has the format "digit, letter, digit, digit, and letter," as shown at the top of FIG. 7. For strings with other formats, different coefficients may be used in the unique binary value encoding function represented by formula 152.

After preprocessing the string so that the string is represented as a unique encoded binary value, block cipher format-preserving encryption operations may be performed at step 162. During the operations of step 162, the binary-encoded string may be processed using a block cipher such as a block cipher of the type shown in FIG. 3. As shown in FIG. 9, the block cipher may be applied to the binary-encoded string at step 164. The operations of step 164 may involve any suitable number of rounds of the block cipher. For example, during step 164, eight rounds of the block cipher may be performed. The use of eight rounds of the block cipher is, however, merely illustrative. Any suitable number of rounds of the block cipher may be performed at step 164 if desired.

As a result of the block cipher operations of step 164, the binary value obtained from step 64 is converted to an encrypted binary value. At step 166, the encrypted binary value that is produced at step 164 is analyzed to determine whether it is format compliant. As described in connection with FIG. 8, when a binary value is operated on by the block cipher, the resulting binary value at the output of the block cipher may not match the format of the original input string. If it is determined at step 166 that the format of the string no longer matches the format of the original string (e.g., if a digit has been transformed into a value that no longer falls within its allowed range of 0-9 as described in connection with FIG. 8), processing can loop back to step 164, as indicated by line 165. In this situation, the current block cipher can again be applied to the binary value. By applying the block cipher to the current block cipher output, the block cipher can update the current block cipher output. This loop can continue until it is determined during step 166 that the format of the encrypted binary value (the current block cipher output) matches the format of the original string obtained at step 64. When it is determined during step 166 that the encrypted binary value output by the block cipher is format compliant, processing may proceed to step 74.

During the operations of step 74, the same unique binary value encoding function that was used during the encoding operations of step 64 and the same index mappings that were used during the encoding operations of step 64 are used to convert the encrypted string back into characters (i.e., characters in the legal set of character values that were defined for each character position). Decoding the encoded version of the string using the unique binary value encoding function and index mappings returns the string to its original character set.

The decoded encrypted string may then be processed to restore elements such as dashes and spaces that were removed during the preprocessing operations of step 64. The decoded encrypted string is ciphertext that corresponds to the plaintext unencrypted string that was obtained at step 64. If desired, the entire string can be encrypted.

By processing the string during step 74, the extraneous elements of the string that were removed during step 64 may be inserted back into the string. Because the extraneous elements are reinserted into the string and because a format-preserving block cipher encryption process was used during step 162, the encrypted string that is produced will have the same format as the original unencrypted string. This allows the encrypted string to be used by applications 16 and databases 18 that require that the original string's format be used. When the encrypted string is provided to an application 16 or database 18, legacy applications and databases that require a specific string format may be able to accept the encrypted string.

Figure 10:
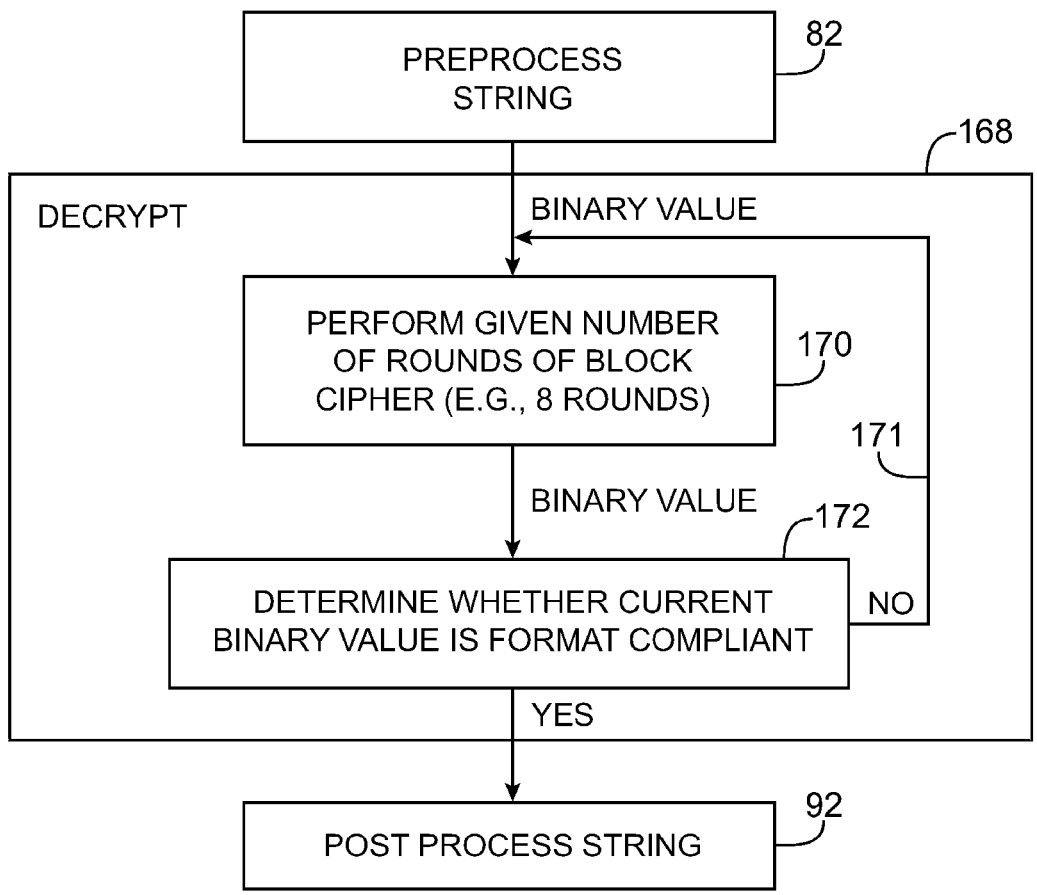
FIG. 10 is a flow chart of illustrative steps involved in using format preserving encryption algorithm to decrypt a data string represented using a unique binary value in accordance with an embodiment of the present invention.

Illustrative steps involved in performing decryption operations by applying an FPE algorithm to a string (and thereby using one or more repeated iterations of a block cipher to ensure format compliance) are shown in FIG. 10.

As shown in FIG. 10, a data string may be preprocessed at step 82, decrypted at step 168, and postprocessed at step 92.

During step 82, the decryption engine obtains the encrypted string. The encrypted string may be retrieved from a database 18 or received from an application 16 and may represent all or part of a larger string. The encrypted string is processed to identify relevant characters. For example, dashes, spaces, and other extraneous elements can be removed from the string, whereas relevant characters in the string can be retained. The process of removing extraneous characters during step 82 is the same as that used during the processing of the unencrypted string that was performed during step 68 of FIG. 5 (step 64 of FIG. 9). After extraneous characters have been removed, decryption engine 28 may use the index mappings that were defined at step 54 of FIG. 4 to convert the processed string (i.e., the string from which the irrelevant characters have been removed) into an encoded encrypted string. For example, each digit in the string may be converted into a corresponding numeric value from 0-9, each letter in the string may be converted into a corresponding numeric value from 0-25, etc. During these encoding operations, decryption engine 28 may use a formula such as formula 152 of FIG. 7 to encode the string to a unique binary value. As with the encoding operations performed during preprocessing step 64 of FIG. 9, the formula that is used during the encoding of step 82 depends on the nature of the string's format. The values used for coefficients 154, 156, 158, and 160 in the FIG. 7 example are merely illustrative.

After preprocessing the string so that the string is represented as a unique encoded binary value, format-preserving decryption operations may be performed at step 168. During the operations of step 168, the binary-encoded string may be processed using a block cipher such as a block cipher of the type shown in FIG. 3. The block cipher may be applied to the binary-encoded string at step 170. The operations of step 170 may involve any suitable number of rounds of the block cipher. For example, eight rounds of the block cipher may be performed during step 170.

As a result of the block cipher operations of step 170, the binary value obtained from step 82 is converted to another binary value. If only one pass through loop 165 of FIG. 9 was used during encryption, a single pass through decryption step 170 will be sufficient to convert the binary value from step 82 into a decrypted binary value. If more passes through loop 165 were used to produce the format-compliant encrypted string, a correspondingly increased number of passes through loop 171 will be required during decryption operations.

At each step 172, the binary value that was produced at step 170 by application of the decrypting block cipher is analyzed to determine whether the binary value is format compliant. When the block cipher is applied to a binary value, the resulting updated binary value at the output of the block cipher may not match the format of the original input string. If it is determined at step 172 that the format of the data string represented by the current binary value (i.e., the current version of the block cipher output) does not match its original format (e.g., if a digit has been transformed into a value that no longer falls within its allowed range of 0-9), processing can loop back to step 170, as indicated by line 171. In this situation, the decrypting block cipher can again be applied to the binary value at step 170 to update the block cipher output. This loop can continue until it is determined during step 172 that the format of the current binary value produced at the output of the decrypting block cipher matches the format of the original encrypted string obtained at step 82. When it is determined during step 172 that the binary value output by the block cipher is format compliant, the encrypted string has been successfully decrypted and processing may proceed to step 92.

During step 92, the index mappings and unique binary encoding scheme that were used during the encoding operations of step 82 may be used to convert the index values of the decrypted string back into their associated characters (i.e., characters in the legal set of character values that were defined for each character position). This returns the decrypted string to its original character set. In strings that contain more than one different type of character, multiple different index mappings may be used. The decoded decrypted string may then be processed to restore elements such as dashes and spaces that were removed.

In addition to format requirements, other requirements may be imposed on the data strings used by applications 16 in system 10. These requirements may include internal and/or external constraints that impose limits on the characters in the data strings in addition to the character set limits that are already imposed by a required format.

An example of an internal constraint on the characters in a string might be a requirement that all of the numbers in a string of numerical digits be presented in ascending order. The valid character set for each of the characters in the string might consist of the set of single-digit numbers (i.e., numbers with values of 0-9). A string that contains a letter character would not be format compliant, but a string made up numbers would be format compliant. To determine whether a given string of numbers complies with the constraint that the numbers be in ascending order, each number in the string can be compared to the next number in the string. A string such as "1456" would satisfy the ascending order constraint, but a string such as "3271" would not satisfy this constraint. The internal constraint on the string therefore imposes a required relationship between the elements of the string separate and apart from the format requirements on each string character. In this example, the relationship requires that each string element have an equal or greater value when compared to its immediately preceding element. This is merely an illustrative example of a constraint that is internal to the elements of a string. A given system such as system 10 may have applications that impose any suitable internal constraint on the strings used in the system in addition to imposing format requirements.

An example of an external constraint on a string is a requirement that a string be accompanied by an associated valid checksum value or that a string be accompanied by an associated invalid checksum value. When a checksum algorithm such as the Luhn algorithm is applied to the given string, a checksum value will be computed. The external constraint on the string might require that this computed checksum value match (or not match) another checksum value associated with the given string. A constraint that requires a given string to be accompanied by a valid checksum value will help ensure that a data string that is formed from the given string and the accompanying checksum value will be compatible with applications that require all checksum values to be valid. A constraint that requires that a given string be accompanied by an invalid checksum value may help ensure that a data item that is formed from the given string and the associated invalid checksum value will be readily recognizable as an encrypted string (as an example). Although this example involves a comparison of the attributes of the elements of a string (i.e., their checksum) to an external value, this is merely illustrative. In general, any suitable external constraint may be imposed on a string.

To handle scenarios in which the characters in a string must comply with internal and/or external constraints in addition to satisfying format requirements, encryption engine 26 and decryption engine 28 may be provided with the ability to ensure that the constraints are satisfied during cryptographic operations. For example, encryption engine 26 may be provided with the ability to check whether constraints have been satisfied before producing a ciphertext output. Similarly, decryption engine 28 may be provided with the ability to check whether constraints have been satisfied before producing a plaintext output.

To ensure that the output of engines 26 and 28 complies with format requirements, engines 26 and 28 may perform cryptographic operations using an FPE algorithm. To ensure that the outputs of engines 26 and 28 also satisfy internal and external constraints imposed on the string characters, engines 26 and 28 may apply the FPE algorithm one or more times until the output of the FPE algorithm satisfies the constraints.

Each time that the FPE algorithm is applied to a given string, the characters in the string will be altered. Encryption engine 26 and decryption engine 28 can exploit this characteristic by repeatedly applying the FPE algorithm to the string until the string satisfies desired constraints. By applying the FPE algorithm repeatedly, the string can be altered as many times as needed without concern about violating format requirements. Once the string has been processed sufficiently to satisfy the desired constraints, further application of the FPE algorithm may be inhibited. The string that satisfies the desired constraints will necessarily also be format compliant, because the FPE algorithm was used during each processing step.

Consider, as an example, a situation in which a string is required to have four digits that are ordered in an ascending fashion. The required format of the string specifies that the string will have four characters each of which is selected from ten numerical digits 0-9. The requirement that the string characters be presented in ascending order serves as an internal constraint on the string characters and specifies a required interrelationship between the string characters that is separate from the requirement that each string character be selected from a valid character set.

Figure 11:
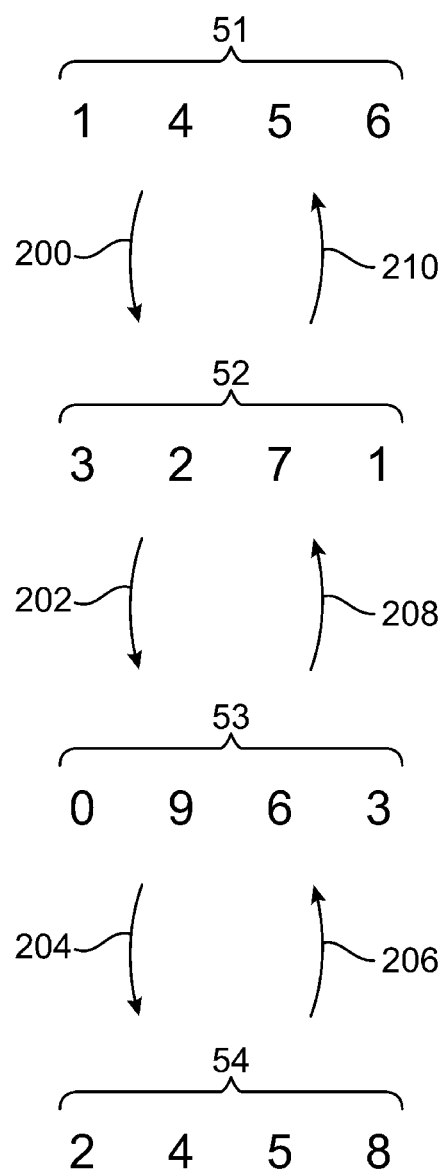
FIG. 11 is a diagram showing how strings can be transformed between plaintext and ciphertext forms by repeated application of a format preserving encryption algorithm of the type described in connection with FIGS. 4 and 5 to satisfy a set of string constraints in accordance with an embodiment of the present invention.

Initially, an unencrypted four digit string of this type may have the value "1456," as shown by illustrative string S1 at the top of FIG. 11. To produce ciphertext, encryption engine 26 may apply an FPE algorithm to string S1. This first application of the FPE algorithm (which is illustrated by line 200 in FIG. 11) results in encrypted string S2 (i.e., the string 3271 in the FIG. 11 example).

String S2 complies with the required string format because string S2 has four numerical characters. However, string S2 does not satisfy the constraint that specifies that each of the characters of the string should be in increasing order. Engine 26 can check whether this constraint has been satisfied by string S2. In the present example, string S2 does not satisfy the ascending order constraint. Engine 26 can therefore reapply the FPE algorithm to produce string S3, as illustrated by line 202 in FIG. 11.

After engine 26 has applied the FPE algorithm to string S2 to produce string S3, engine 26 may analyze string S3 to determine whether its digits are in the required order. In the example of FIG. 11, S3 does not satisfy the ascending order constraint, so engine 26 can apply the FPE algorithm an additional time. In particular, engine 26 can apply the FPE algorithm to string S3 to produce string S4, as illustrated by line 204.

After string S4 has been produced, encryption engine 26 can analyze the characters in string S4 to determine whether they satisfy the ascending order constraint. In the example of FIG. 11, each character in string S4 has a value that equals or exceeds the value of the preceding character in string S4. String S4 therefore satisfies the ascending order constraint. Because this constraint has been satisfied, encryption engine 26 can forego further applications of the FPE algorithm to the string. The current processed version of the string (S4 in this example) can be used as the ciphertext output from engine 26 (i.e., encrypted string S4 represents the ciphertext produced by encrypting plaintext string S1 with encryption engine 26).

During decryption operations, decryption engine 28 can similarly apply the FPE algorithm (i.e., the decryption algorithm described in connection with FIG. 3) one or more times until the resulting output satisfies the desired constraint (i.e., the ascending order constraint).

In the FIG. 11 example, decryption engine 28 first applies the FPE algorithm to string S4 in an attempt to decrypt string S4 while satisfying the ascending order constraint. As shown by line 206 in FIG. 11, this first application of the FPE algorithm by decryption engine 28 results in a string (string S3) that does not satisfy the ascending order constraint. Decryption engine 28 checks string S3 to determine whether the ascending order constraint has been satisfied and, because this constraint has not been satisfied, applies the FPE algorithm to the string a second time to produce string S2 (as indicated by line 208).

String S2 also does not satisfy the ascending order constraint, so decryption engine 28 applies the FPE algorithm to the string a third time. As shown by line 210, this results in string S1. Once decryption engine 28 determines that string S1 satisfies the ascending order constraint, further application of the FPE algorithm can be inhibited and string S1 can serve as the final plaintext string corresponding to ciphertext string S4.

Figure 12:
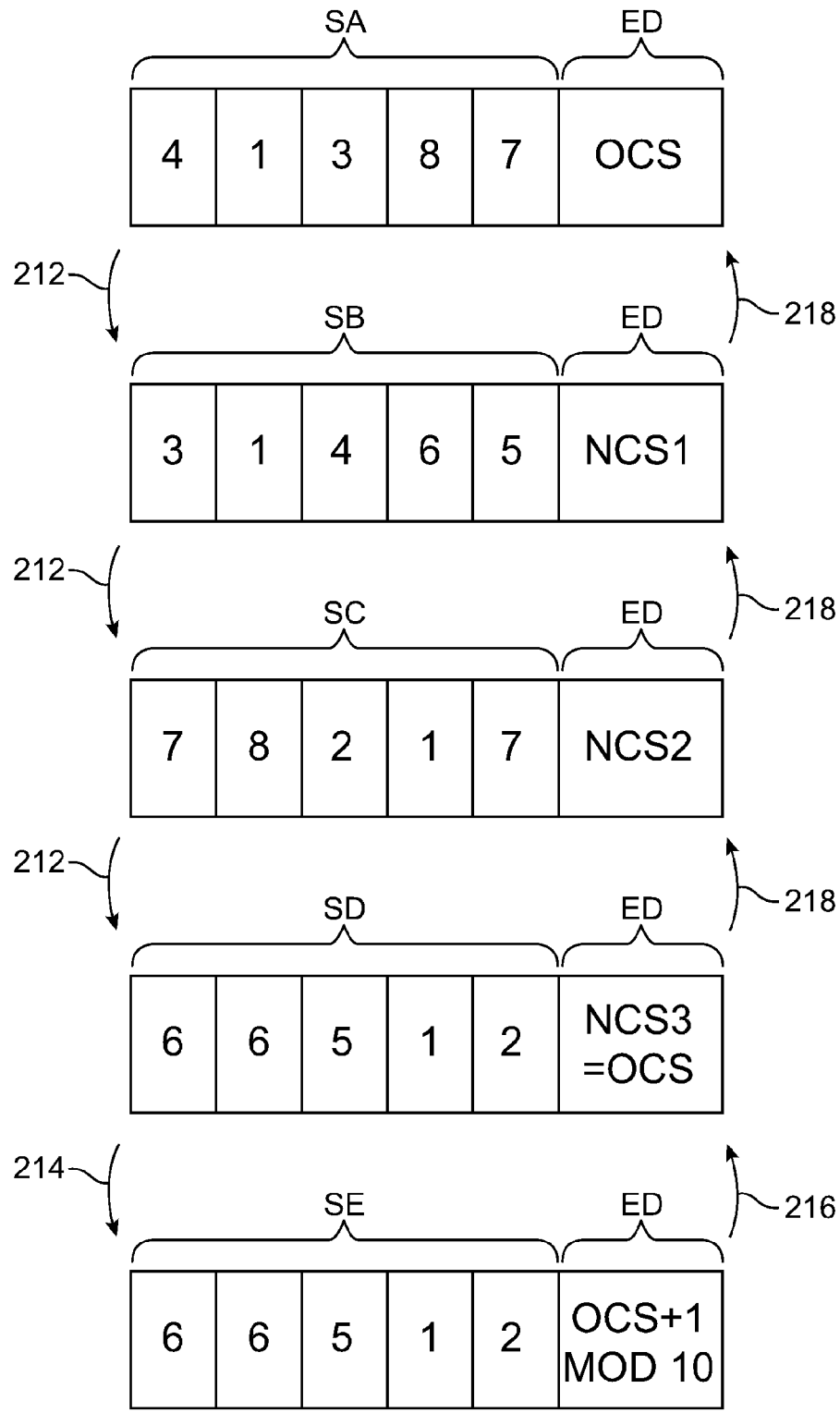
FIG. 12 is diagram showing how strings can be transformed between plaintext and ciphertext forms by repeated application of a format preserving encryption algorithm of the type described in connection with FIGS. 4 and 5 to satisfy another set of string constraints in accordance with an embodiment of the present invention.

An example of using the repeated applications of the FPE algorithm to ensure compliance with an external constraint on the character values in a string is shown in FIG. 12. In the example of FIG. 12, a string has a five digit format. Each character of the string must be a digit with a value between 0 and 9. Letter characters and strings longer or shorter than five digits are not permitted by the string format. The string must also satisfy a checksum constraint in which the checksum of the five digits of the string are compared to an associated digit (i.e., a digit that is external to the five digit string). In a first scenario (sometimes referred to as a valid checksum scenario), the checksum constraint specifies that the checksum of the five digits (or a larger group of digits in which the five digits are embedded) should match the external digit (i.e., the external digit must represent a valid checksum for the string). In a second scenario (sometimes referred to as an invalid checksum scenario), the checksum constraint specifies that the checksum of the five digits (or a string in which the five digits are contained) should not match the external digit when the string is encrypted (i.e., the external digit must represent an invalid checksum for the ciphertext version of the string). The invalid checksum scenario may further specify that the plaintext version of the string has a valid checksum.

Both the valid checksum and invalid checksum scenarios are illustrated in FIG. 12. As shown in FIG. 12, the string (shown in various forms as strings SA-SE) has five digits. Extra digit ED is distinct from the five digit string, but is associated with the five digit string. The five digit string and its associated extra digit ED may be handled as a single data item (i.e., a string) by applications 16 (FIG. 1). For example, applications 16 may store the string and extra digit ED together as an entry in a database table (as an example).

Initially, the string is unencrypted. This is shown by plaintext string SA ("41387") in FIG. 12. By application of the Luhn algorithm or other suitable checksum algorithm, a valid checksum value for string SA may be computed. This original checksum value is shown as original checksum value OCS.

Lines 212 represent repeated applications of the FPE encryption algorithm by encryption engine 26. Each time the FPE encryption algorithm is applied to the string, the characters in the string are altered. For example, the application of the FPE algorithm to string SA results in string SB ("31465"), the application of the FPE algorithm to string SB produces string SC ("78217"), and the application of the FPE algorithm to string SC results in string SD ("66512"). Each time that encryption engine 26 applies the FPE algorithm to the string, the checksum for the string can be recomputed (e.g., using the Luhn algorithm). For example, a checksum NCS1 can be produced from string SB, a checksum NCS2 can be produced from string SC, and a checksum NCS3 can be produced from string SD.

When operating under a valid checksum constraint arrangement, encryption engine 26 can reapply the FPE algorithm to the string and can recalculate the checksum for the processed string as many times as necessary until the computed checksum equals the original checksum (OCS) (i.e., until the desired external constraint on the encrypted string has been satisfied). In the example of FIG. 12, this situation arises after three applications of the FPE algorithm (i.e., when string SD has been produced). Because the checksum NCS3 of string SD equals the original checksum value OCS of plaintext SA, no further applications of the FPE algorithm are needed. Processing therefore terminates and encryption engine 26 uses the string SD as the ciphertext output corresponding to plaintext string SA. This ciphertext can be used in combination with checksum OCS to form a data item for use in system 10. The production of a ciphertext string whose associated checksum is valid may help ensure compatibility with legacy applications.

When operating under an invalid checksum constraint arrangement, encryption engine 26 can perform an additional operation after producing string SD. This additional operation, which is illustrated by line 214 in FIG. 12, involves altering the extra digit ED so that the extra digit no longer represents a valid checksum. One way that the extra digit ED may be modified is by applying a mapping to checksum NCS3. As an example, an offset value may be added to digit ED (modulo 10). The offset value may be a number from 1 to 9.

With one suitable arrangement, which is sometimes described herein as an example, an offset value of 1 is used. When the offset is equal to 1, step 214 involves adding 1 to NCS3 so that extra digit ED is transformed from the valid value associated with string SD to the invalid value (OSC+1) mod 10 that is associated with string SE. String SE is not changed (i.e., string SE is equal to string SD). This ensures that the ciphertext string SE will have an extra digit ED that does not represent a valid checksum for string SE (i.e., ED will be an invalid checksum for string SE). Using this type of arrangement, an application 16 that retrieves a ciphertext string (string SE) and its associated invalid checksum digit ED (i.e., [OSC+1] mod 10) can readily determine (by computing the checksum for the string and comparing that newly computed checksum to the extra digit) that the checksum for the string is invalid and that the string has therefore been encrypted. The use of step 214 to produce a known invalid checksum for string SE therefore allows the invalid checksum to serve as a flag that indicates that string SE is in encrypted form (as compared to string SA, which is in unencrypted form.).

During decryption operations, the operations of steps 212 and step 214 may be reversed by decryption engine 28. In particular, in an invalid checksum scenario, the invalid checksum digit ED can be converted to a valid checksum NCS3 by subtracting the offset modulo 10 (i.e., by subtracting 1 from the invalid checksum to produce valid checksum NCS3=OCS). By this process (which is illustrated by line 216 in FIG. 12), the known invalid checksum of OCS+1 is made valid. The valid checksum can then be retained by decryption engine 28. During each subsequent step 218, decryption engine 28 may apply the FPE decryption algorithm to the string and may compute a corresponding checksum value. This newly computed checksum value can be compared to the retained valid checksum (OCS). Once the processed string has a checksum that matches the retained checksum (and therefore matches the original checksum OCS), the decryption engine can stop applying the FPE algorithm to the string. The processed string (equal to string SA in the example of FIG. 12) can then be used as the plaintext string corresponding to ciphertext string SE.

In valid checksum scenarios (i.e., in systems in which step 214 is not performed and in which the checksum of the ciphertext is always valid), the conversion operation of step 216 can be omitted. Instead, decryption engine 28 may repeatedly apply the FPE decryption algorithm to the string until the checksum of the string is valid. In the example of FIG. 12, this involves three applications of the FPE decryption algorithm. In general, the FPE algorithm may be applied any suitable number of times (i.e., one or more times) until the checksum of the processed string equals the original checksum value OCS.

Figure 13:
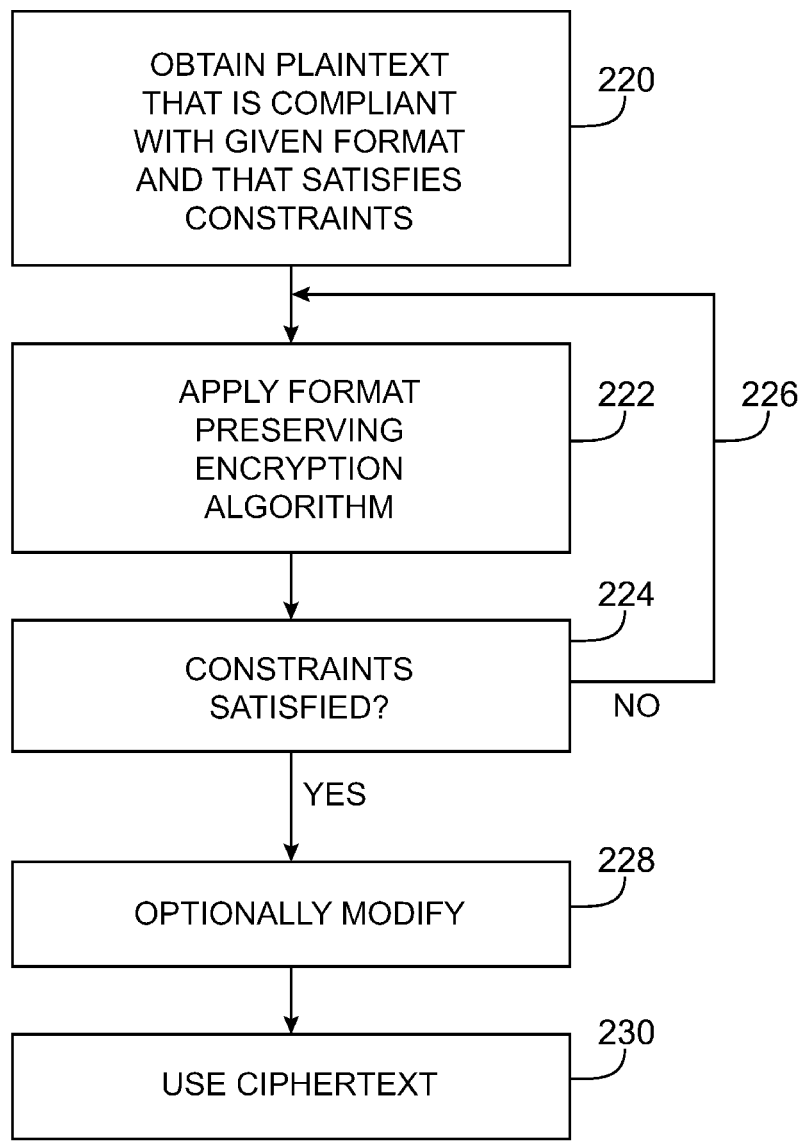
FIG. 13 is a flow chart of illustrative operations involved in encrypting a plaintext string in a process that involves repeatedly applying a format preserving encryption algorithm to the string in accordance with an embodiment of the present invention.

Illustrative operations involved in using encryption engine 26 in encrypting a string using format preserving encryption (FPE) cryptography while satisfying internal and/or external string constraints are shown in FIG. 13.

At step 220, a plaintext string may be obtained. As an example, an application may extract the account number portion of a credit card. The plaintext string complies with a given format (e.g., each character in the string has a value that is selected from a legal set of character values for that character). The plaintext string may also satisfy internal and/or external constraints. Examples of internal string constraints are constraints in which some or all of the characters are required to exhibit a particular interrelationship (e.g., the characters in the string are required to all be odd numbers or all even numbers, the characters are required to appear in ascending order, the characters are required to appear in descending order, etc.). Examples of external string constraints are constraints in which some or all of the characters are required to have a particular relationship to external data (e.g., the characters are required to have a checksum that matches a precomputed external checksum value, the characters are required to have a checksum that does not match a precomputed external checksum value, etc.).

At step 222, encryption engine 26 may apply an FPE encryption algorithm to the string. During each application of the FPE encryption algorithm, a block cipher of the type described in connection with FIG. 3 may be applied to the string one or more times, as described in connection with loop 165 of FIG. 9. Because the FPE encryption algorithm does not alter the format of the string, the version of the string that is produced by the application of the FPE algorithm at step 222 will have the same format as the plaintext version of the string that was obtained at step 220.

The encrypted version of the string that is produced following application of the FPE algorithm at step 222 may or may not satisfy the desired string constraints. Accordingly, encryption engine 26 can check whether desired constraints are satisfied at step 224. If the current encrypted version of the string does not satisfy the constraints, processing can loop back to step 222 for further application of the FPE encryption algorithm, as indicated by line 226. If the current encrypted version of the string satisfies the constraints, the current version of the string can be used as the ciphertext output of encryption engine 26.

When implementing constraints such as constraints associated with an invalid checksum scenario, the constraints test of step 224 may involve determining whether a valid checksum has been produced. Step 228 may then be performed (e.g., to add a "1" to the extra digit ED to ensure that the checksum digit that is associated with the string is invalid and thereby satisfy the external constraint on the string).

At step 230, the current value of the processed string can be used as the ciphertext output of encryption engine 26. The optionally modified values (e.g., the extra digit ED) may be incorporated into a data item that includes the encrypted string (i.e., a larger string may be formed from the encrypted string ED, etc.).

Figure 14:
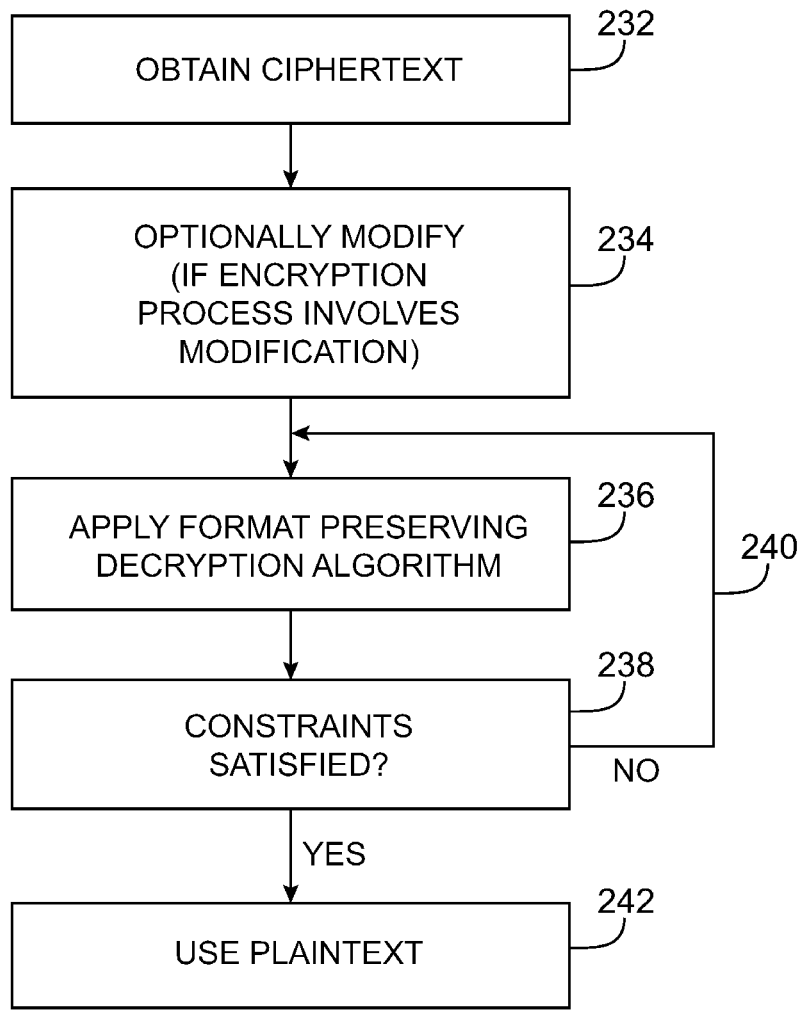
FIG. 14 is a flow chart of illustrative operations involved in decrypting a ciphertext string in a process that involves repeatedly applying a format preserving encryption algorithm to the string in accordance with an embodiment of the present invention.

Illustrative operations involved in using decryption engine 28 in decrypting an encrypted string (i.e., the ciphertext produced by encryption engine 26 using the operations of FIG. 13) are shown in FIG. 14.

At step 232, a ciphertext string may be obtained. As an example, an application may extract an encrypted string from the account number portion of a credit card field from a database. The ciphertext string complies with the same given format as the plaintext string obtained at step 220 of FIG. 13 (e.g., each character in the string has a value that is selected from a legal set of character values for that character). The ciphertext string may also satisfy internal and/or external constraints.

At step 234, optional modification operations may be performed. For example, modification operations can be performed by decryption engine 28 to add a negative version of the offset that was added during the optional modifications of step 228 to an extra digit that is associated with the string (as described in connection with operation 216 of FIG. 12). The need to decrypt the string and the need to perform these modification operations can be flagged by the presence of an invalid checksum digit (as an example).

At step 236, decryption engine 28 may apply the FPE decryption algorithm to the string (i.e., the FPE decryption algorithm that corresponds to the FPE encryption algorithm used at step 222 of FIG. 13). During each application of the FPE decryption algorithm, a block cipher of the type described in connection with FIG. 3 may be applied to the string one or more times, as described in connection with loop 171 of FIG. 10. Because the FPE decryption and encryption algorithms are related to each other (i.e., because the same block cipher is used during both encryption and decryption operations as described in connection with FIG. 3), the FPE encryption and decryption algorithms are sometimes collectively referred to as an FPE cryptographic algorithm(s)

Because the FPE algorithm does not alter the format of the string, the version of the string that is produced by the application of the FPE algorithm at step 236 will have the same format as the ciphertext version of the string that was obtained at step 232.

At step 238, decryption engine 28 can determine whether the desired string constraints have been satisfied. If the current version of the processed string does not satisfy the constraints, processing can loop back to step 236 for further application of the FPE decryption algorithm, as indicated by line 240. If the current version of the string satisfies the constraints, the current version of the string can be used as the plaintext output of decryption engine 28.

This plaintext can then be used by applications 16 (step 242).

The foregoing is merely illustrative of the principles of this invention and various modifications can be made by those skilled in the art without departing from the scope and spirit of the invention.

What is claimed is:

1. A method for performing cryptographic operations using computing equipment, comprising:
    with the computing equipment, obtaining a plaintext version of a string of characters that have a given format, wherein the plaintext version of the string includes a first checksum value computed using a given checksum algorithm;
    with the computing equipment, applying a format preserving encryption algorithm to the string to produce an encrypted version of the string that complies with the given format, wherein the encrypted version of the string includes a second checksum value;
    with the computing equipment, applying the given checksum algorithm to the encrypted version of the string, not including the second checksum value, to produce a third checksum value;
    with the computing equipment, determining that the second checksum value is a valid checksum value for the encrypted version of the string by determining that the second checksum value matches the third checksum value;
    when the second checksum value is a valid checksum value for the encrypted version of the string, halting further application of the format preserving encryption algorithm with the computing equipment and using the encrypted string as ciphertext corresponding to the plaintext version of the string; and
    when the second checksum value is not a valid checksum value for the encrypted version of the string, applying the format preserving encryption algorithm to the encrypted version of the string with the computing equipment at least one additional time to alter the encrypted version of the string until the second checksum value is a valid checksum value for the encrypted version of the string and the encrypted version of the string serves as ciphertext corresponding to the plaintext version of the string.

2. The method defined in claim 1 wherein applying the format preserving encryption operation to the string to produce the encrypted version of the string involves multiple applications of a block cipher to an encoded binary value that represents the plaintext version of the string.

3. A method for performing cryptographic operations using computing equipment, comprising:
    with the computing equipment, obtaining a plaintext version of a string of characters that have a given format, wherein the plaintext version of the string includes a first checksum value computed using a given checksum algorithm;
    with the computing equipment, applying a format preserving encryption algorithm to the string to produce an encrypted version of the string that complies with the given format, wherein the encrypted version of the string includes a second checksum value;
    with the computing equipment, applying the given checksum algorithm to the encrypted version of the string, not including the second checksum value, to produce a third checksum value;
    with the computing equipment, determining that the second checksum value is a valid checksum value for the encrypted version of the string by determining that the second checksum value matches the third checksum value;
    when the second checksum value is an invalid checksum value for the encrypted version of the string, halting further application of the format preserving encryption algorithm with the computing equipment and using the encrypted string as ciphertext corresponding to the plaintext version of the string; and
    when the second checksum value is a valid checksum value for the encrypted version of the string, applying the format preserving encryption algorithm to the encrypted version of the string with the computing equipment at least one additional time to alter the encrypted version of the string until the second checksum value is an invalid checksum value for the encrypted version of the string and the encrypted version of the string serves as ciphertext corresponding to the plaintext version of the string.

4. The method defined in claim 3 wherein applying the format preserving encryption operation to the string to produce the encrypted version of the string involves multiple applications of a block cipher to an encoded binary value that represents the plaintext version of the string.

* * * * *